(12) United States Patent
Swaminathan

(10) Patent No.: US 11,132,655 B2
(45) Date of Patent: Sep. 28, 2021

(54) SYSTEM AND METHOD FOR PAYER-CENTRIC ELECTRONIC PAYMENTS

(71) Applicant: Kishore Swaminathan, Willowbrook, IL (US)

(72) Inventor: Kishore Swaminathan, Willowbrook, IL (US)

(*) Notice: Subject to any disclaimer, the term of this patent is extended or adjusted under 35 U.S.C. 154(b) by 0 days.

(21) Appl. No.: 17/129,141

(22) Filed: Dec. 21, 2020

(65) Prior Publication Data

US 2021/0192476 A1 Jun. 24, 2021

Related U.S. Application Data

(60) Provisional application No. 62/950,361, filed on Dec. 19, 2019.

(51) Int. Cl.
| | | |
|---|---|---|
| *G06Q 20/02* | (2012.01) | |
| *G06Q 20/10* | (2012.01) | |
| *G06Q 20/18* | (2012.01) | |
| *G06Q 20/20* | (2012.01) | |
| *G06Q 20/32* | (2012.01) | |
| *G06Q 20/38* | (2012.01) | |
| *G07F 9/00* | (2006.01) | |
| *H04W 12/40* | (2021.01) | |
| *G06Q 30/06* | (2012.01) | |
| *G06K 7/14* | (2006.01) | |

(52) U.S. Cl.
CPC ......... *G06Q 20/102* (2013.01); *G06Q 20/027* (2013.01); *G06Q 20/18* (2013.01); *G06Q 20/202* (2013.01); *G06Q 20/3226* (2013.01); *G06Q 20/3821* (2013.01); *G06Q 20/3825* (2013.01); *G06Q 30/0633* (2013.01); *G07F 9/001* (2020.05); *G07F 9/002* (2020.05); *H04W 12/40* (2021.01); *G06K 7/1417* (2013.01); *G06Q 20/326* (2020.05); *G06Q 20/3276* (2013.01)

(58) Field of Classification Search
None
See application file for complete search history.

(56) References Cited

U.S. PATENT DOCUMENTS

| | | | | |
|---|---|---|---|---|
| 9,213,972 | B2 * | 12/2015 | Dorso | G06Q 20/42 |
| 2014/0310174 | A1 * | 10/2014 | Heeter | G06Q 20/3276 705/44 |
| 2016/0092880 | A1 * | 3/2016 | Klingen | G06Q 20/027 705/16 |
| 2018/0204195 | A1 * | 7/2018 | Kang | G06Q 20/3276 |
| 2019/0333043 | A1 * | 10/2019 | Ben Avi | G06Q 20/202 |

* cited by examiner

*Primary Examiner* — Joseph W. King

(57) ABSTRACT

Unlike the prevalent paradigm for electronic payments where merchants own, orchestrate, and drive the payment process, embodiments of this invention enable customers to pay for products and services from their personal computers or mobile devices without involving the merchant in the payment process. Merchants place their payment requests into a payment bus and customers fulfill these requests in any way they please—from any device, at any time, through any payment service. We refer to the payment paradigm described here as Payer-Centric Payments (PCP) as opposed to Merchant-Centric Payments (MCP) that is commonplace today. This invention is applicable for physical, online, and vending machine payments and provides significant benefits to both customers and merchants.

22 Claims, 35 Drawing Sheets

```
"header": {
    "type": "request",
    "request_id": 113774565,
    "merchant_id": "Franks Store",
    "customer_id": "angela@elfpoint.com",
    "amount": 29.95,
    "currency": "usd",
    "timestamp": 1576502422,
    "status": "active",
    "add_tips": false,
    "tax_deductability": false,
    "fulfillment_count": 1,
},
"body": {}
```

Fig. 14

```
[
  "header": {
    "type": "transaction",
    "transaction_id": 1127745653,
    "request_id": 1137745653,
    "merchant_id": "Franks Store",
    "customer_id": "angela@elfpoint.com",
    "transaction_amount": 29.95,
    "currency": "usd",
    "timestamp": 1575638528,
    "confirmation_id": C454536788,
    "recurring": false,
    "commission": 1.21
  },
  "body": {},
  "tracker": {
    "gateway": "Stripe",
    "payment_source": "CCC4657879",
    "nickname": "Visa ****4242"
  }
]
```

— 1504

You have received a payment invoice from Franks Store

Invoice

Franks Store

Date For Amount
12/06/19  angela@elfpoint.com  $29.95
Invoice ID: 1137745653

Your Payment

Invoice     1137745653

Amount $   29.95

● Visa **** 4242
○ Mastercard **** 8210 or enter new card

PAY

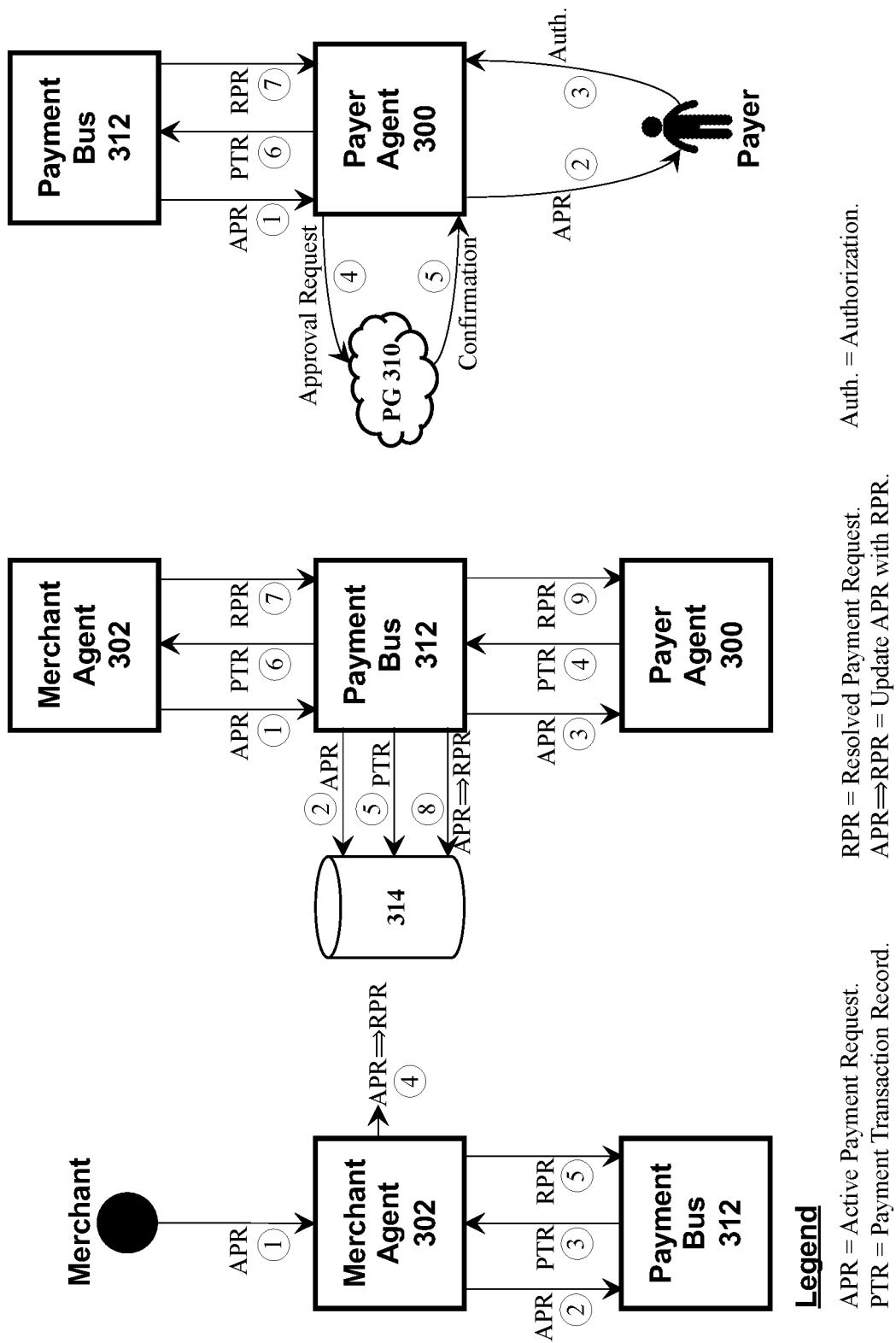

Topaz Café
606 Village Dr
Somewhere IL 60606

Dec 03, 2019

Table 22

| | |
|---|---|
| 1 Chardonnay | 6.95 |
| 1 Bruschetta | 7.95 |
| 1 Pesto Pasta | 19.95 |
| 1 Tiramisu | 7.95 |
| Tax | 2.60 |
| Please pay this amount | 45.40 |

Scan from your mobile to pay

Thanks for your business!
Please come again

— 2004

Topaz Café

🏠 Dashboard
▦ Navigation
  Create check
  Pending
  Paid
  Merchant Profile

Check Details

| | |
|---|---|
| Invoice Number | 3748130364 |
| Customer ID | - |
| Date | Dec 03, 2019 12:39 pm |
| Amount | $ 45.40 |
| Paid | No |
| Check opened | No |
| Expires on | Dec 03, 2019 2:39 pm |
| QR code for check | |

[Print check with QRcode]

You scanned an invoice from Topaz Café

Invoice

Topaz Café

Date
12/03/19
Invoice ID: 3748130364

Your Payment

| | | Amount |
|---|---|---|
| Billed | $ | $45.40 |
| Tips | $ | 45.40 |
| Total | | 45.40 |

● Visa **** 4242
○ Mastercard **** 8210
or enter new card

PAY

---

Topaz Café

Invoice ID: 3748130364

Date: 12/03/19

Check Amount: $45.40

Tips: $7.00

Total: $52.45

This invoice has been paid. Thank you!

Review Topaz Café on yelp

Accept coupons from Topaz Café?

● Yes
○ No

Paid with: Visa **** 4242

2102  2104

```
2304
[ "header": {
    "type": "request",
    "request_id": "KC-22847",
    "merchant_id": "Kids Casuals",
    "customer_id": null,
    "amount": 25.30,
    "currency": "usd",
    "timestamp": 1575638528,
    "status": "active",
    "taxes": 1.32,
    "claimed": false,
    "information_request": {
        "shipping_address"
    }
    "pp_api_endpoint": "XXXXXXXXXX"
},
"body": {}
]

2302
[ "header": {
    "type": "request",
    "request_id": "KC-22847",
    "merchant_id": "Kids Casuals",
    "customer_id": "angela@elfpoint.com",
    "amount": 25.30,
    "currency": "usd",
    "timestamp": 1575638528,
    "status": "active",
    "taxes": 1.32,
    "information_request": {
        "shipping_address"
    }
},
"body": {}
]
```

Note: "XXXXXXXXXX" stands for a long URL that specifies the API-endpoint

Fig. 23

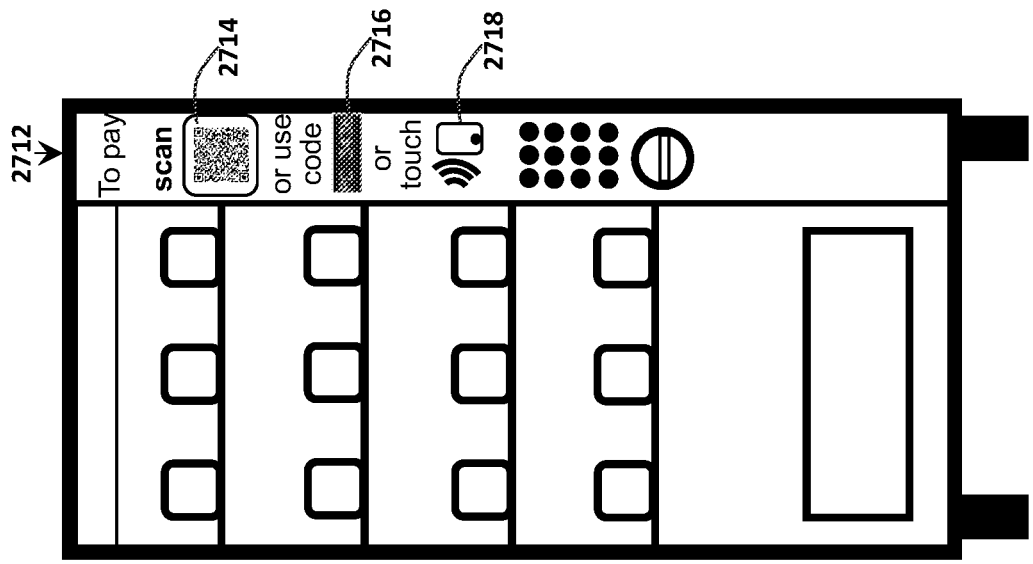
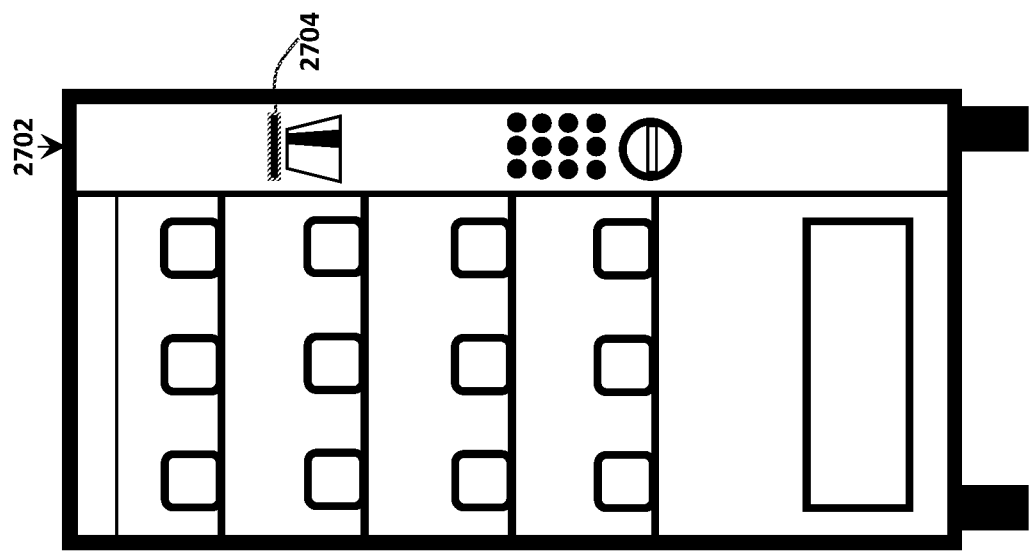
Fig. 27

```
"header": {
    "request_id": 678086979,
    "merchant_id": "ESPN",
    "customer_id": "angela@elfpoint.com",
    "requested_amount": 19.95,
    "currency_unit": "usd",
    "expiration_date": "dec-15-2019",
    "status": "active",
    "recurring": true,
    "recurrence_parameters": {
        "frequency": "monthly",
        "start_date": "12-14-19",
        "end_date": null,
        "cancel_link":
            "espn.com/cancel?id=678086979"
    },
    "add_tips": false,
    "taxes": 0,
    "information_request": [
        "zipcode"
    ],
    "tax_deductibility": false,
    "fulfillment_count": 1,
    "transaction_id": null
},
"body": {
    "Program Guide": "guide.pdf",
    "Customer Support": "1-855-645-3343",
    "Plan Info": "espn.com/678086979"
}
}
```

Fig. 28

Recurring Payment Invoice

ESPN

| Date | For | Amount |
|---|---|---|
| 12/14/19 | angela@elfpoint.com | $19.95 |

Invoice ID: 1137745653

Your Payment

Due: 12/15/19
Frequency: Monthly
Amount: $19.95

Cancel Payment

☐ Remind me every month

● Visa **** 4242
○ Mastercard **** 8210 or enter new card

[ PAY ]

2902

2904

Your Recurring Payments

Customer ID: angela@elfpoint.com

| Payee | Freq | Amt | Link |
|---|---|---|---|
| Netflix | Monthly | $21.95 | ↑ |
| Comcast | Monthly | $36.95 | ↑ |
| ESPN | Monthly | $19.95 | ↑ |
| Vimeo | Qtrly | $11.95 | ↑ |
| IL Toll | Replenish | $20.00 | ↑ |
| Apple | On demand | N/A | |

Fig. 29

SYSTEM AND METHOD FOR PAYER-CENTRIC ELECTRONIC PAYMENTS

CROSS-REFERENCE TO RELATED APPLICATIONS

The present application claims the benefit of Provisional Patent Application U.S. 62/950,361 which is incorporated by reference herein in its entirety.

FIELD OF INVENTION

This invention is in the fields of electronic payments. It describes systems and methods that enable payers to pay from computing devices at stores, websites, or at vending machines.

BACKGROUND

Today's electronic payments may be seen as Merchant Centric Payments (MCP), where the payee or the merchant initiates, owns and orchestrates the payment process: when the payer checks out, the merchant creates a transaction record in a cash register or database, obtains the payer's payment credentials, and sends the payment amount and the credentials to a payment gateway (PG) such as Payment Tech or Stripe. The PG obtains payment authorization from the financial institution that controls the customer's payment source and returns a confirmation code to the merchant. The merchant updates his or her transaction record and provides the customer a receipt. As such, in today's electronic payments, merchants or payees initiate, own and orchestrate the entire payment process. FIG. 01 provides a high-level view of the MCP paradigm.

Contactless mobile payments are no exception to the MCP paradigm. Instead of presenting a payment source or credit card physically to a merchant, contactless payment technologies simply transmit the payment credentials wirelessly to the merchant. It is the merchant, not the mobile device, that orchestrates the payment process.

Unfortunately, the prevalent MCP paradigm presents several problems and disadvantages for both customers and merchants. A well-recognized disadvantage is that, in the MCP paradigm, customers have to share their credentials with each merchant to whom they make a payment. An unscrupulous store clerk or a waiter can easily appropriate and abuse a customer's payment credential. More seriously, the IT systems that store the payment information can be broken into by cyber criminals from anywhere, leading to wholesale theft of thousands of payment credentials at once—an occurrence that's all too common.

Different types of solutions address different aspects of this problem. Database encryption is widely used to mask stored credit cards from prying eyes; smart cards use embedded microchips for processing a card transaction more securely (though a person or a visual scanner can still read the card visually); pattern recognition algorithms at credit card companies and banks try to recognize and deny fraudulent transactions; one-time card numbers or "tokens" enable a payer to escrow a card with a third party who provides a token to identify a given card for a short time and/or for a given transaction. Payment systems like Apple Pay store a temporary token for an escrowed card securely in a special hardware chip and transmits the token wirelessly to the merchant.

While these solutions attempt to increase the safety of a given transaction, they do not address the aggregate safety of a payment source. For example, if a payer pays a merchant who does not support Apple Pay, one-time card numbers or tokens—as each solution requires a different proprietary infrastructure—the customer is forced to expose the payment credential to that merchant, potentially creating a weak link. The more such businesses that a payer interacts with, the higher the risk that the payer's credentials will be compromised.

Payment systems like PayPal, Pay™, Alipay etc. take a different approach. They require merchants as well as payers—whose credentials or funds they hold in escrow—be their clients. When an authenticated payer approves a payment, these payment systems release an escrowed card (or funds) to themselves and complete the payment as a payment gateway. As such, they create a closed ecosystem or walled garden within which both merchants and customers have to operate. While these payment systems enjoy considerable market success, their walled garden approach means that, if a particular merchant is not within the same walled garden as the payer, the customer is forced to reveal his payment credential to that merchant, creating a weak link as before. As weak links proliferate, the risk that the payer's credentials would be compromised through one weak link or another goes up. Put differently, the apparent safety afforded by walled-garden approaches such as Paypal, Alipay or Pay™ do not stem from technical factors, but from market dominance or the size of their walled garden.

A more serious, "back-end" or non-obvious disadvantage arises from the fact that, in the MCP paradigm, a payer does not give a payment to the payee but provides a payment credential with which the payee takes the payment. While not a big factor in a one-time transaction, it is a a big factor with automatic and recurring payments such as subscriptions. When a customer authorizes a merchant to charge recurring payments to their credit card, the customer gives the merchant a standing instruction or authorization to keep charging to the card. Since these authorizations are invisible to the card issuer and often forgotten by the customer, most customers do not have a consolidated view of all their recurring payments. It is not uncommon for customers to be paying—unknowingly—for services that they no longer use. Merchants often lure customers into giving them a standing authorization through free or limited-time offers, knowing fully well that a sizeable number of subscribers will forget that they signed up, and will continue to pay, unwittingly, until either they remember, examine statement, or cancel their card.

Even more insidiously, these standing instructions can be several levels deep within a payment chain. As an example, take "app stores" that sell mobile apps, which in turn sell services inside the app, known as "in-app purchases." An app store may not only have standing instructions to charge to a customer's card, an app from the app store may have standing instructions to charge recurring payments to the app store. Although no reliable estimates exist, customers are believed to pay billions of dollars annually through automatic and recurring payments for subscriptions that they no longer use, no longer remember, and whose authorizations are scattered across multiple merchants and other third-party payment services such as app stores.

MCP also poses several problems for merchants. First is the capital and maintenance cost of the payment machinery. Cost of card readers, PIN entry pads, contactless NFC readers etc. can range from a few hundred to several thousand dollars depending on features, speed, and integration options. Many small merchants get the equipment for free from payment processing companies but pay a hefty monthly fee under a long-term contract with early-termination fees.

Second, any failure of the payment infrastructure can be catastrophic for a merchant due to lost sales and revenue. As we will see, with a payer-centric model, customers provide the payment infrastructure, thereby eliminating single catastrophic points of failures.

Third, in the MCP paradigm, the merchant's capacity to process payments is fixed by the capacity of the infrastructure. A merchant with three card readers can process three payments at a time. With our invention, the merchant gets an elastic payment infrastructure that has as much capacity as there are payers. See embodiment E6 for an illustration.

Fourth, for physical payments, the MCP paradigm requires contact and/or proximity between the payer and the payee. With credit cards, the payer has to physically swipe a card into the payee's card reader. With contactless, the payer's mobile device must be within a few inches from the merchant. The Covid-19 pandemic of 2020 showed that contact and proximity can be limiting during extraordinary times. Contactless payments are also inconvenient in drive-in payments, where a payer in a vehicle cannot get close enough to a card reader.

Fifth, in eCommerce, the MCP paradigm often acts as a barrier to entry for small merchants since customers are reluctant to provide their payment credentials to small merchants, and/or resistant to re-entering their payment credential into yet another website.

Sixth, for automated vending machines that are unattended and exposed to the elements, a full-fledged payment machinery with card readers and wide-area data connection can be expensive as they have to be rugged and tamper-proof. As the cost of the payment machinery increases, the machines themselves become a target of theft and vandalism.

In conclusion, the MCP paradigm made sense in the past when technological capabilities of merchants and customers were asymmetric: established merchants rather than customers could be expected to own or have access to infrastructure needed to execute an electronic payment. That is no longer the case. Today, every customer has access to a smart device with network access that is often more powerful and has a faster renewal cycle than legacy payment systems operated by most merchants. Therefore, it is now possible to consider other payment paradigms that mitigate or eliminate many of the disadvantages of the MCP paradigm.

SUMMARY OF THIS INVENTION

FIG. 02 is a high-level overview of our invention. Merchants place payment requests on a payment bus that ferries the requests to the payers; payers pay for these requests in any way they please, from any device, at any time, through any payment gateway; then they place a confirmation of their payment transaction onto the same bus to be ferried back to the merchant.

Functionally, embodiments of this invention enable customers to have a single payment system on their own devices from which they can pay any participating merchant—a physical store, a website, or a vending machine—without sharing their payment credentials with the merchant. Embodiments of this invention enable customers to pay anonymously or via an alias and enable merchants to accept payments without any payment infrastructure. Also, since customers pay from their own devices, customers do not have to wait in line for cashiers or cash registers. We refer to embodiments of our invention as Payer-Centric Payment Systems (PCPS).

Structurally, the heart of a PCPS embodiment is a payment bus that acts as a store- and forward conduit through which payers and payees can exchange payment-related messages within a uniform address space. What this means is that (a) payers, payees and payment-related messages have unique identities through which they can be referenced and retrieved, and (b) payment requests from merchants are no longer internal, transient records inside a merchant's cash register or IT system, but are externalized and placed into the payment bus as first-class objects, (c) the bus can deliver a payment message synchronously and without polling to a designated recipient, and (d) the bus can also deliver messages on demand in case of system failure or if the recipient is not known when a payment request is made (embodiments E2 and E4). As such, payment requests can be accessed from anywhere on any device via the Internet. As a result, a payment request can originate in one place—say, at a cash register or an online shopping cart—and can be paid from a different device and at a different time by the customer.

FIG. 02 provided a high-level overview of our invention. We now delve one level deeper to introduce payer agents and merchant agents that simplify the design of our embodiments. The agents act on behalf of (and as proxy for) payers and merchants. They handle the mechanics of integration with the payment bus and payment gateways, the tedium of bookkeeping, authentication, and other low-level functions. FIG. 06 depicts a payment scenario from one embodiment: when a payer checks out at a store, the merchant sends a payment request to thee merchant agent and displays the request's ID as a QR code (we describe other modalities later). The merchant agent places the request in the payment bus. When the payer scans the code with her mobile, the payer's agent retrieves the request by ID from the bus and displays it in the payer's device. The payer can enter a payment credential. The payer agent contacts a payment gateway to complete the payment and places a payment transaction record confirming the payment in the payment bus. The bus ferries it to the merchant agent who verifies the transaction and credits the merchant.

The payment bus in our invention differs from today's payment systems in some important ways. First, the bus nature of the payment bus enables all the parties to synchronously receive data that concerns them. Second, the address space of the bus makes customers, merchants and transactions uniquely addressable across the Internet by anybody with right access credentials. Third, the externalization of the payment request through the bus eliminates the tenuous nature of the transient association between a transaction record and a customer. This means that a transaction can originate at one device in one organization and can be accessed from another device elsewhere immediately or at any later time through its unique ID.

Since the transaction is no longer owned by or hidden within a merchant's cash register or IT system, it is no longer confined to be paid only through that merchant. More specifically, it can now be paid from the customer's own device. That, in a nutshell, is the crux of our invention.

LIST OF FIGURES

FIG. 01 provides a high-level pictorial view of the Merchant-Centric Payment paradigm.

FIG. 02 provides a high-level overview of Payer-Centric Payments.

Figure 6:
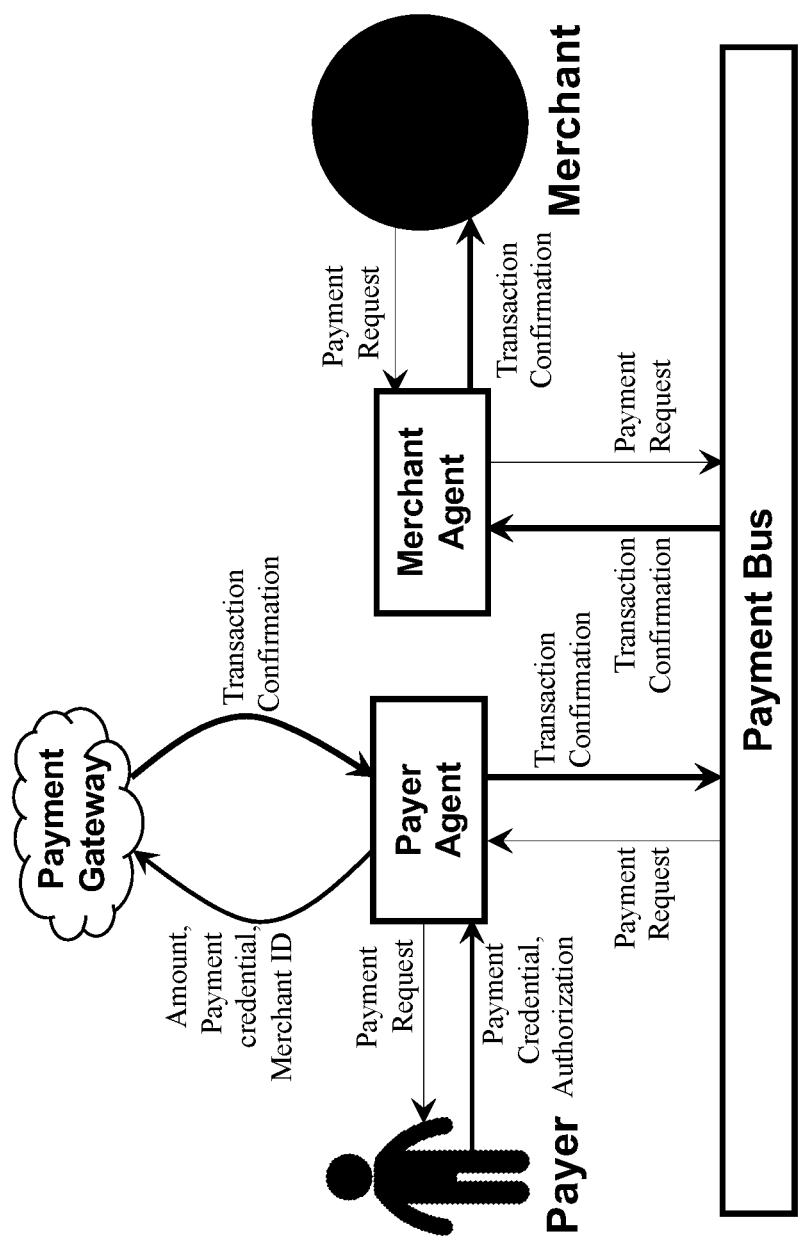

FIG. 06 provides a summary of the of the payment method described by our invention.

Figure 7:
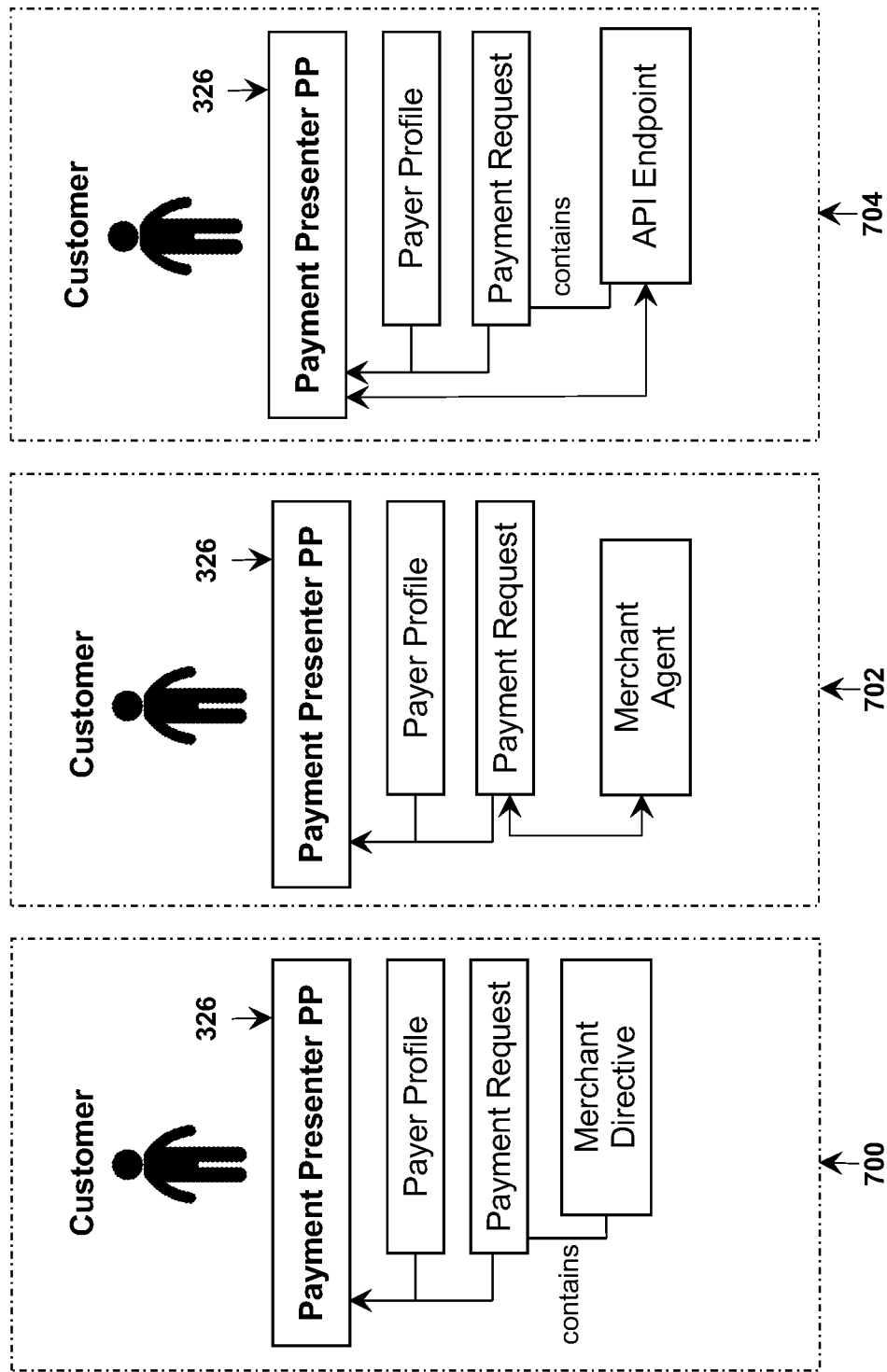
Figure 8:
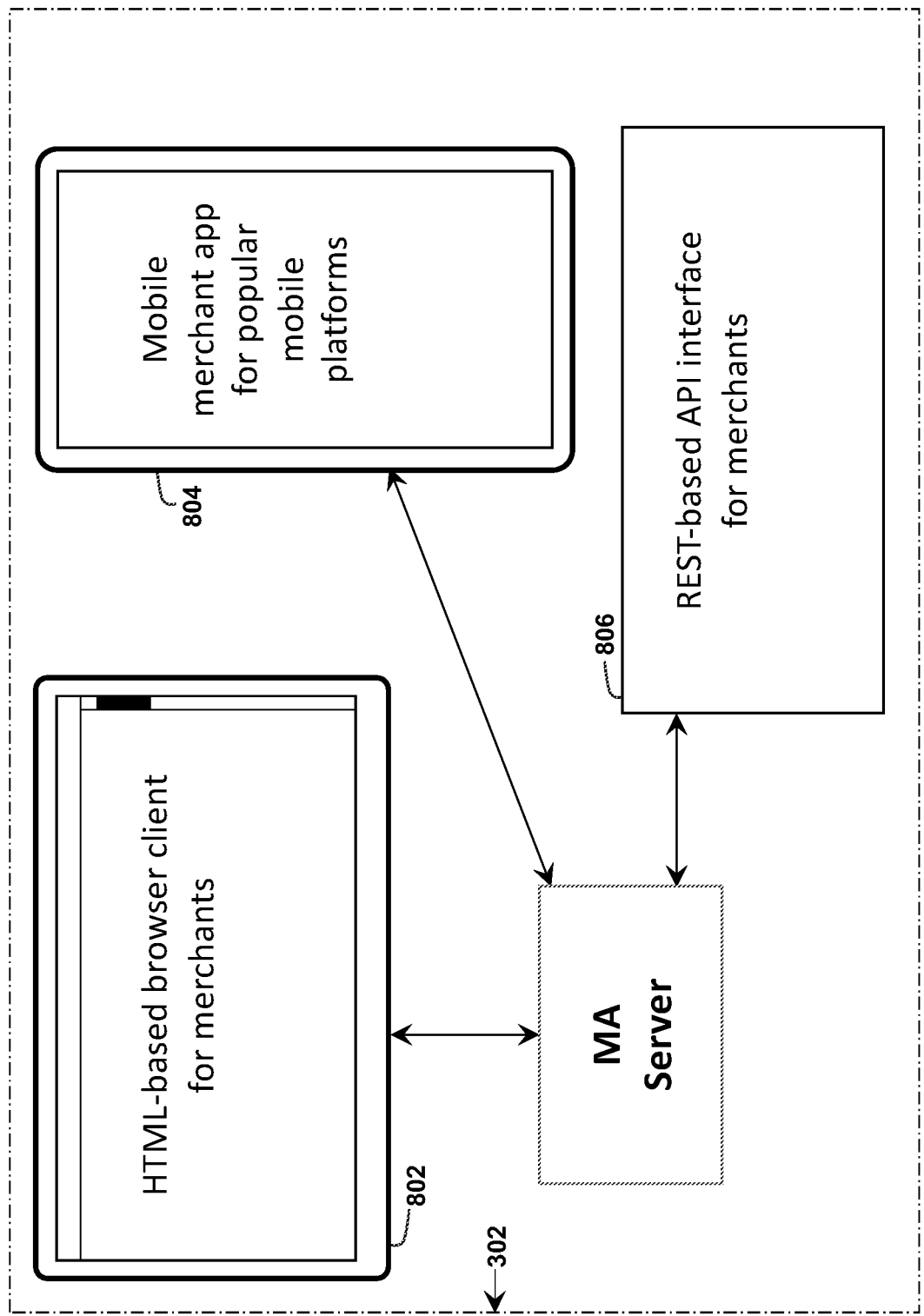

FIG. 07 depicts different architectures for Payment Presenter used in some embodiments FIG. 08 depicts different technical architectures for Merchant Agent.

Figure 9:
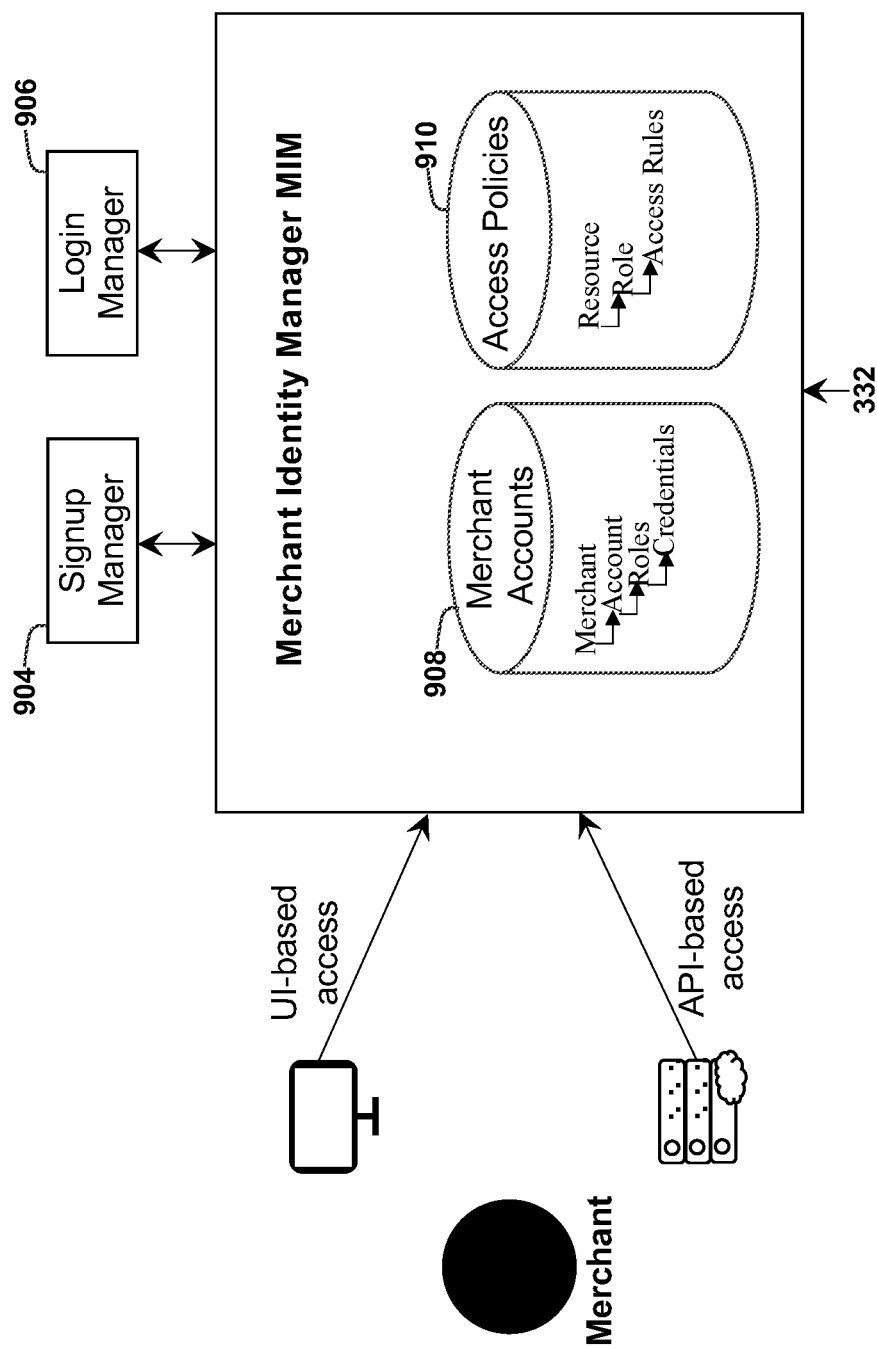

FIG. 09 is a schematic of the Merchant Identity Manager MIM.

Figure 10:

FIG. 10 is a screenshot of the Merchant Profile Manager MPM from an embodiment.

Figure 11:
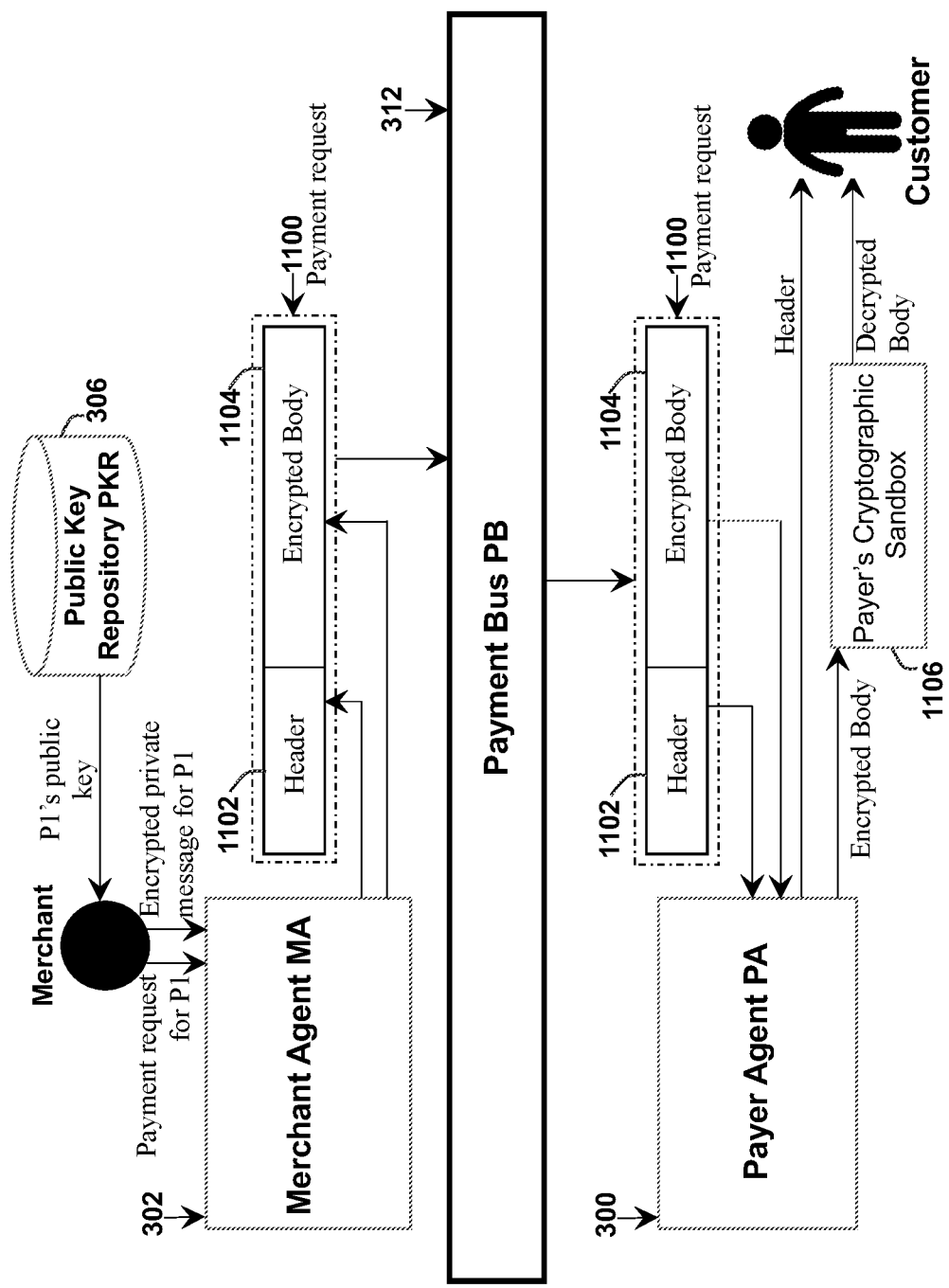

FIG. 11 shows how merchants and payers can exchange encrypted messages for extra privacy.

Figure 12:
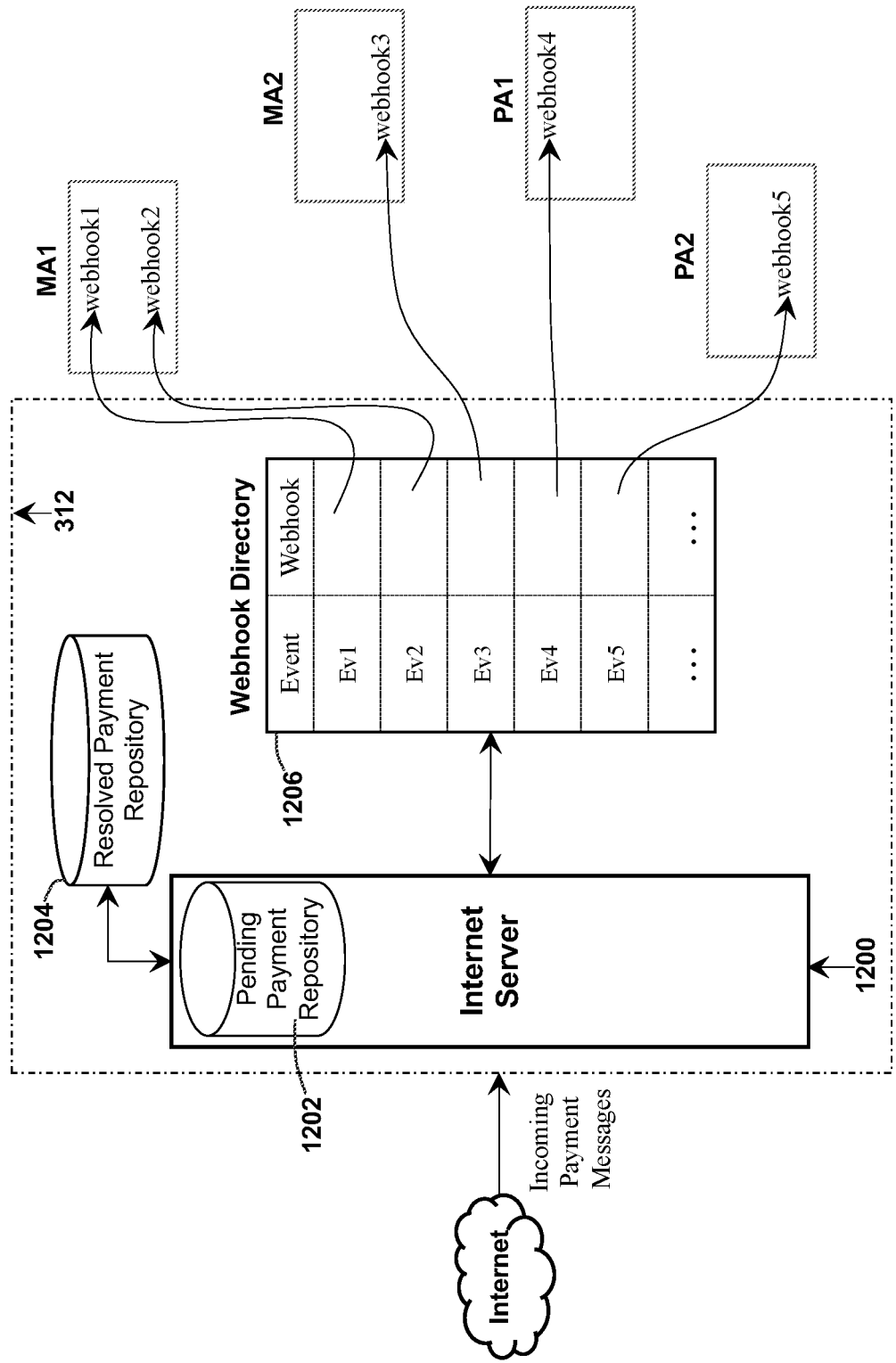

FIG. 12 depicts a Payment Bus implementation using webhooks.

Figure 13:
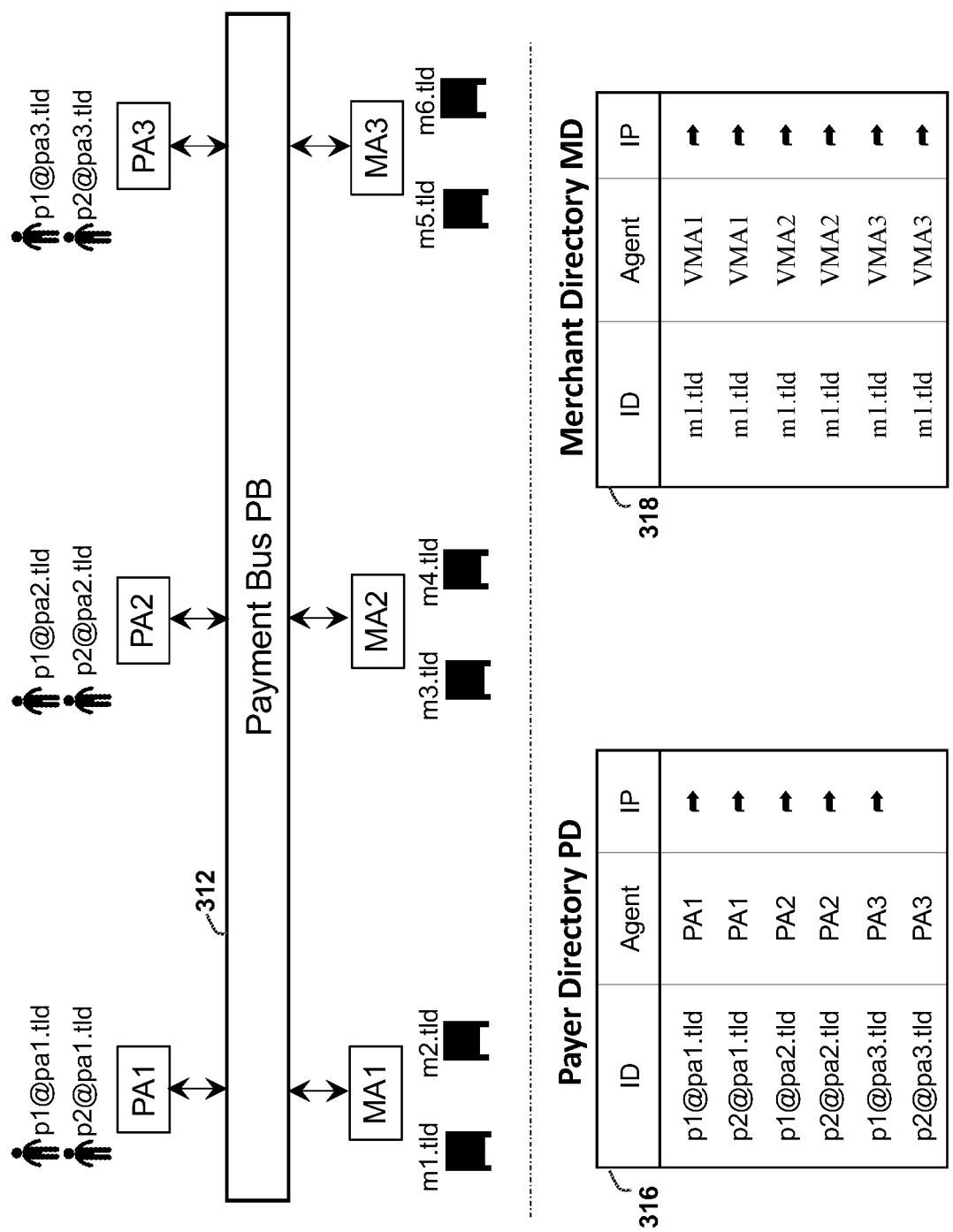

FIG. 13 depicts many payer and merchant agents in a single address space.

FIG. 14 is a screenshot of a merchant creating a payment request and its JSON representation.

FIG. 15 is a screenshot from E0 of a payment request being presented to a payer and its payment transaction record PTR.

Figure 16A:
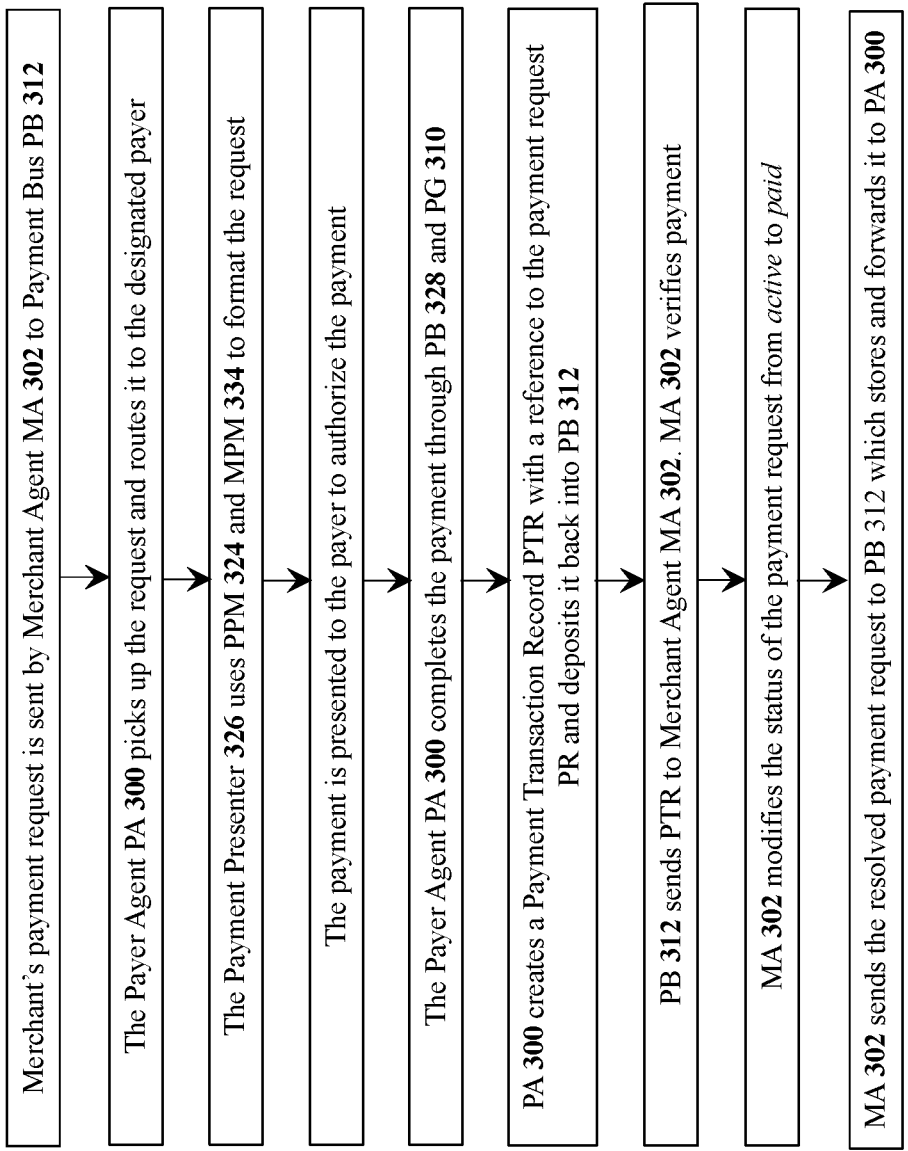

FIG. 16A depicts the steps that subsystems of E0 go through to execute a payment process.

Figure 16B:
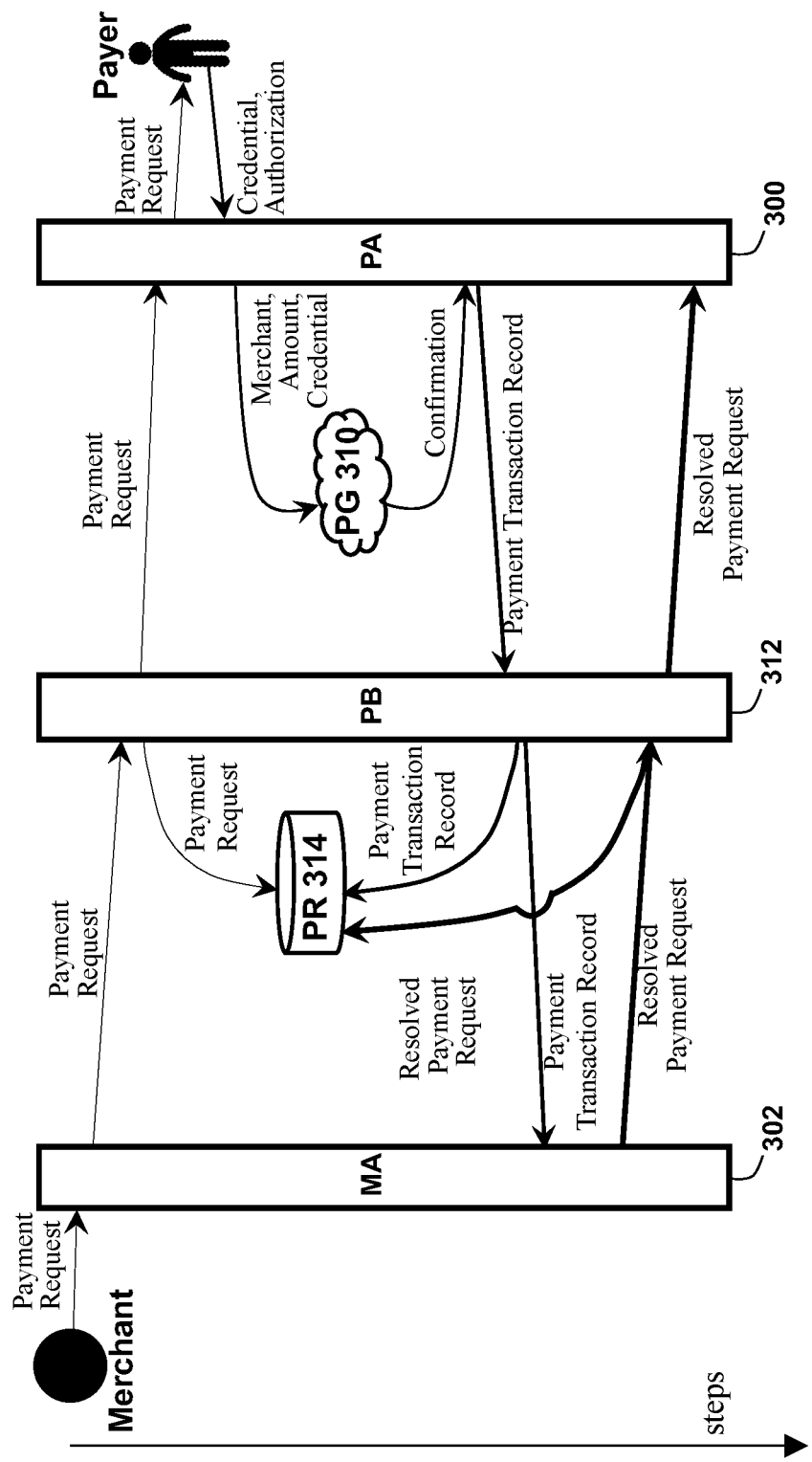

FIG. 16B depicts the dataflow of embodiment E0 as it executes the steps of a payment.

FIG. 16C depicts the dataflow of E0 from the point of view of MA 302, PA 300 and PB 312.

Figure 17:
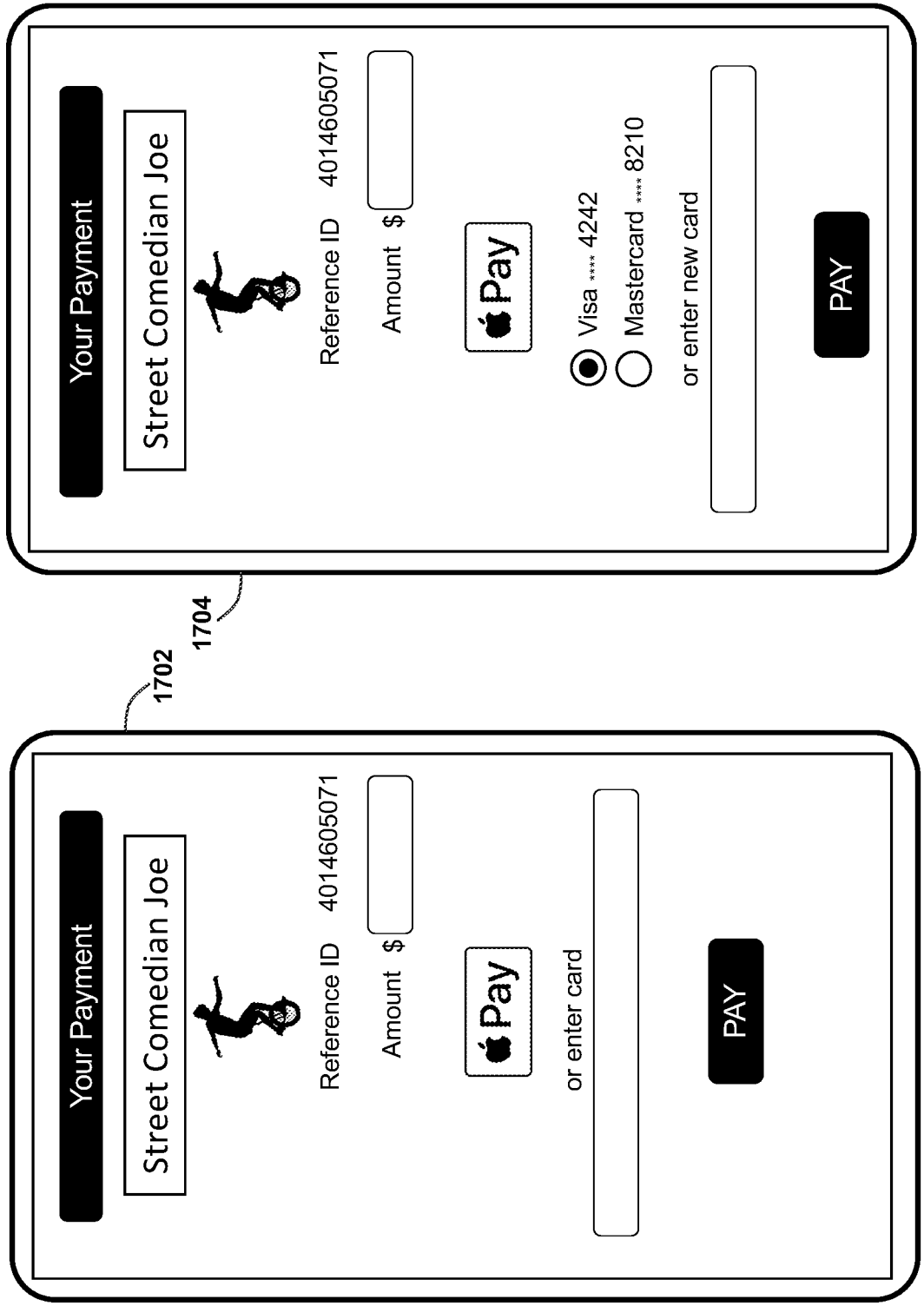

FIG. 17 contains screenshots of the payment screen from E1.

Figure 18:
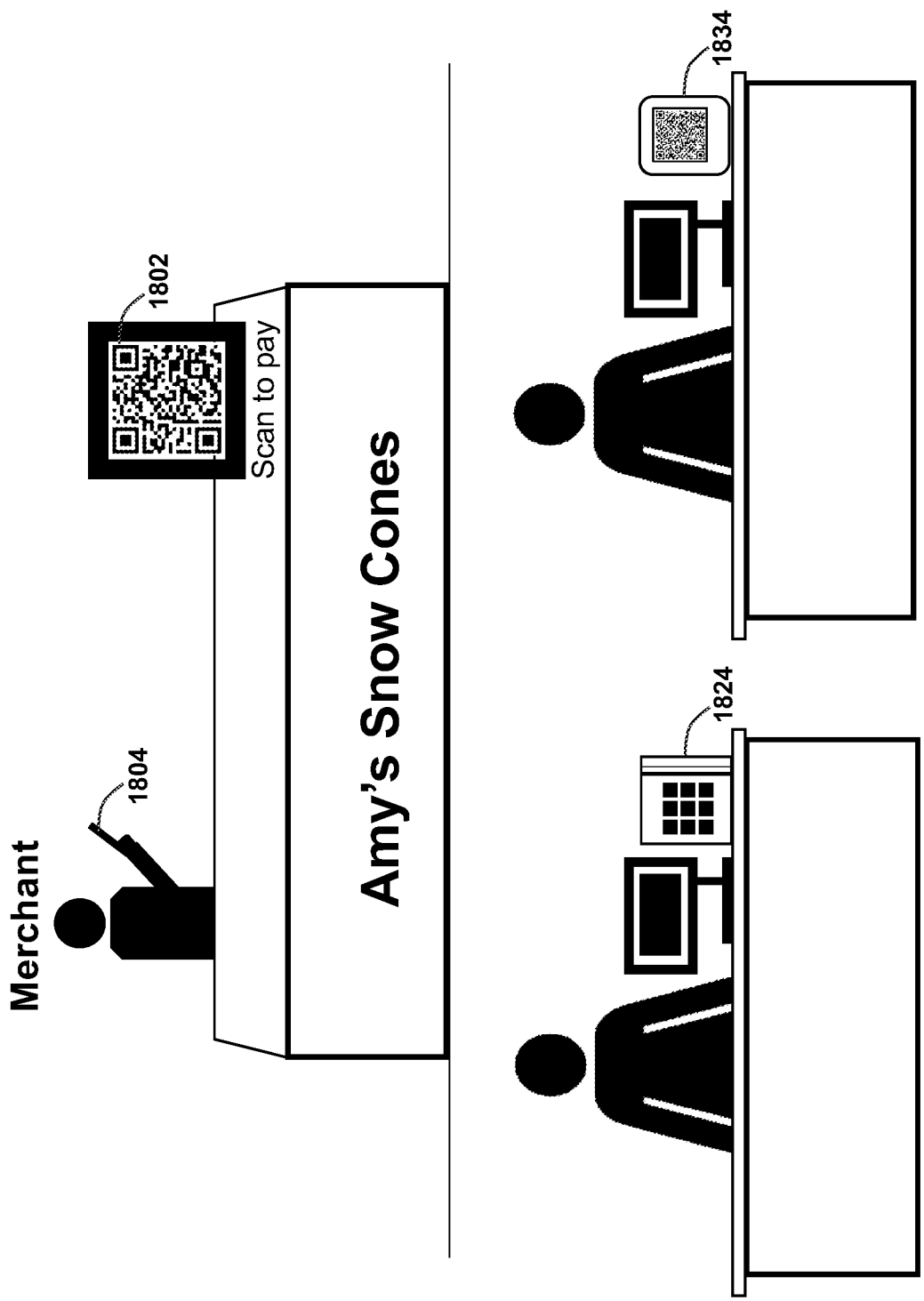

FIG. 18 shows different scenarios for an infrastructure-less cash register.

Figure 19:
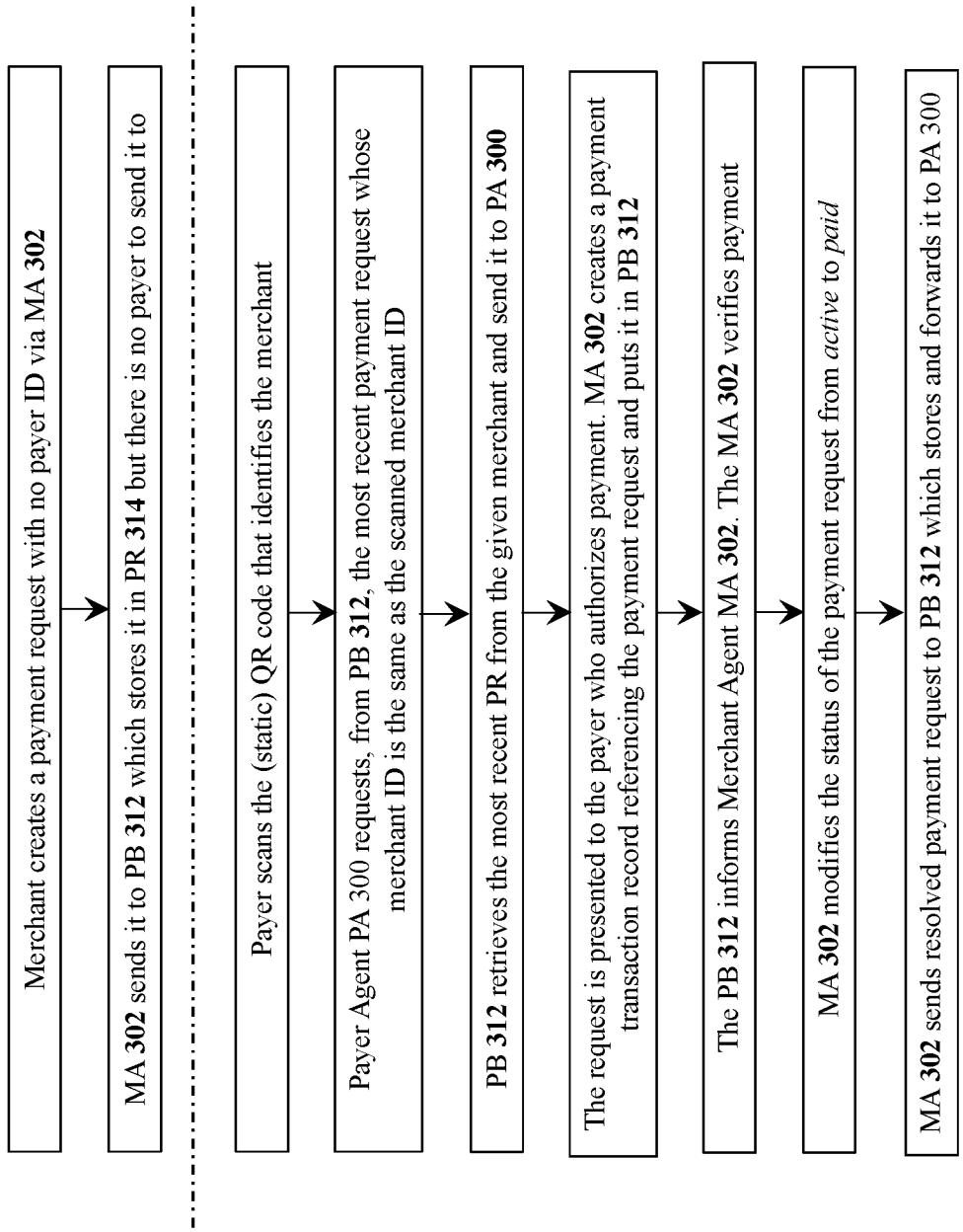

FIG. 19 shows the process flow for the infrastructure-less cash register.

FIG. 20 shows a restaurant creating a payment request for a customer and the printed check FIG. 21 shows the payment and payment acknowledgment screens from E2.

Figure 22:

FIG. 22 shows the shopping cart from E3.

FIG. 23 shows the JSON representation of payment request for E3 and E4.

Figure 24:
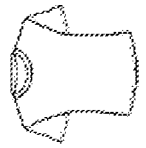

FIG. 24 shows the shopping cart from E4.

Figure 25:
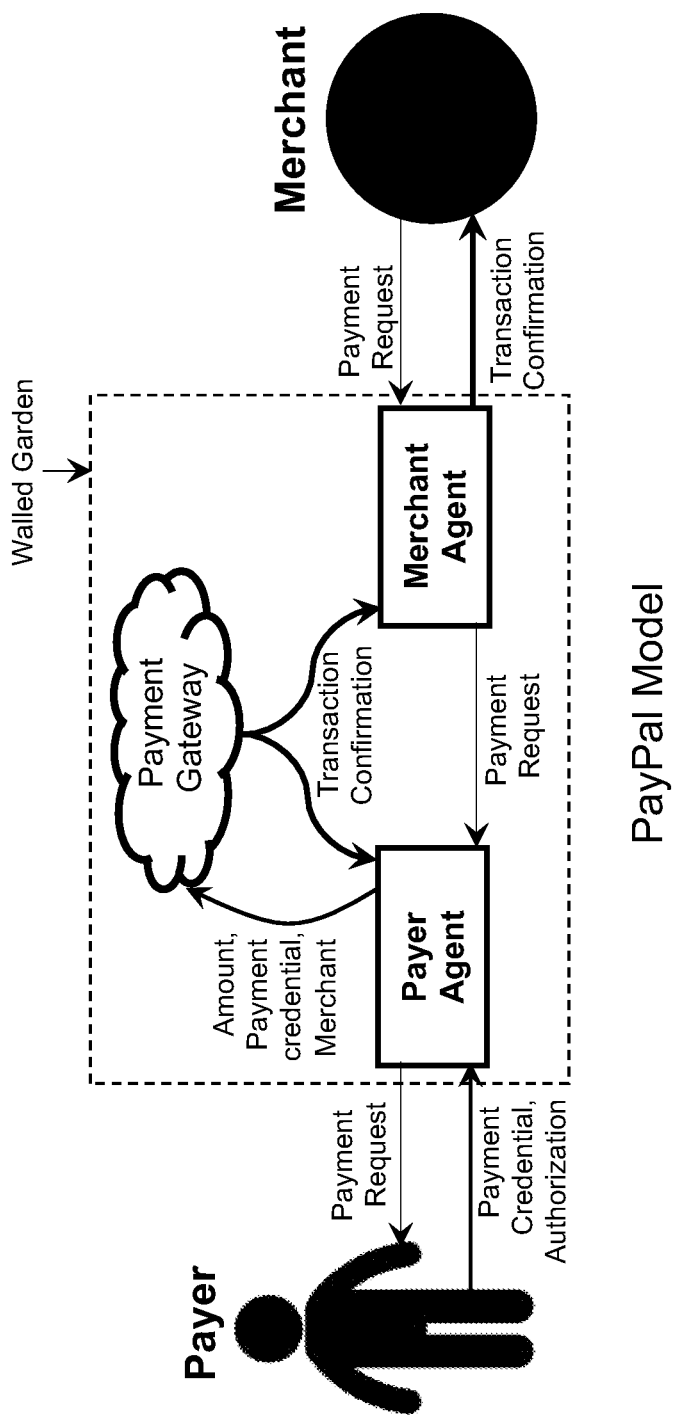

FIG. 25 is a schematic of PayPal payment model for comparison with our invention.

Figure 26:
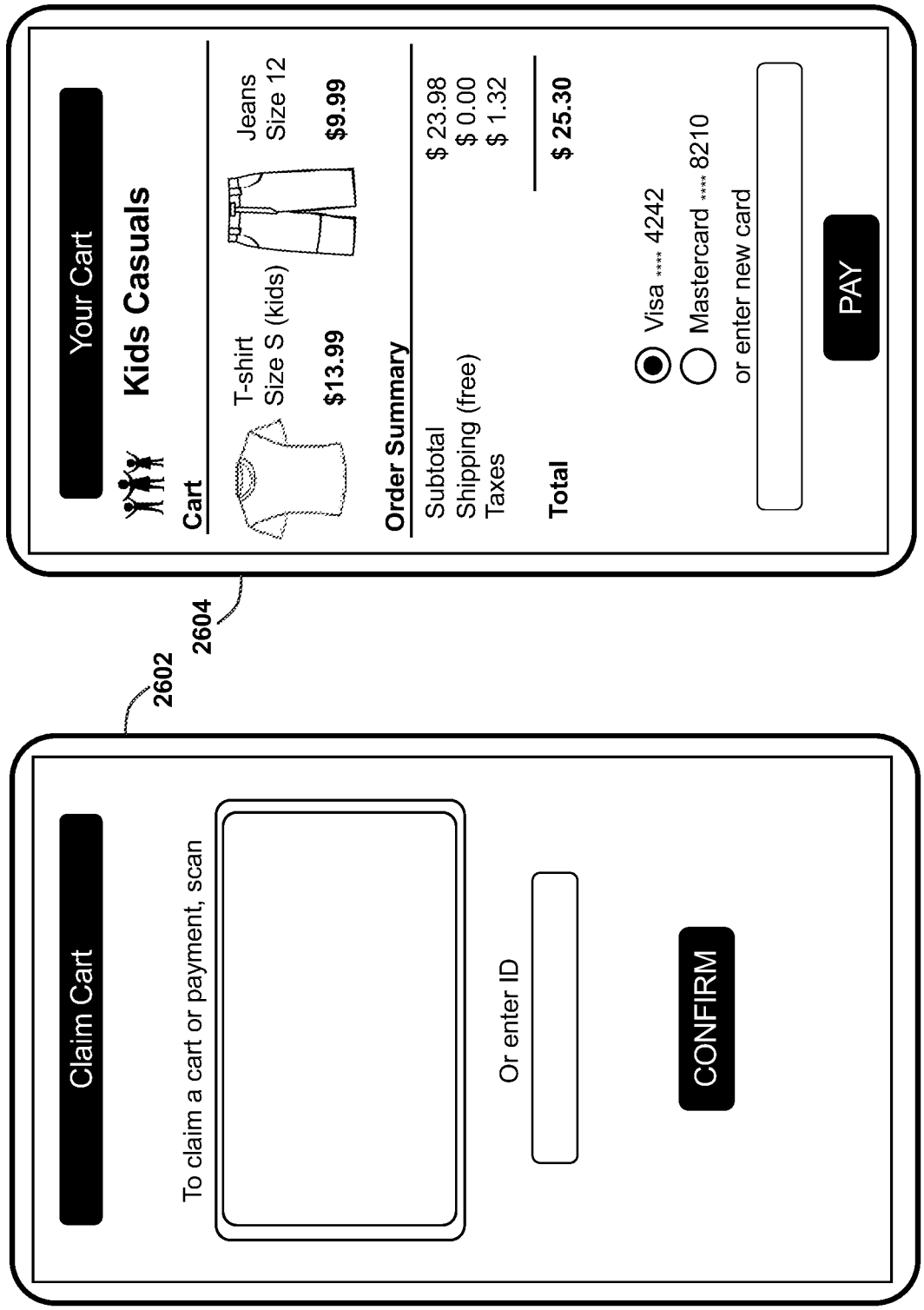

FIG. 26 shows the claim screen and the payment screen of payment app of embodiment E4.

FIG. 27 shows a regular and a modified vending machine that can accept payment from E4.

FIG. 28 shows the JSON representation of a payment request from E5.

FIG. 29 shows two screenshots from E5 pertaining to automatic payments.

Figure 30:
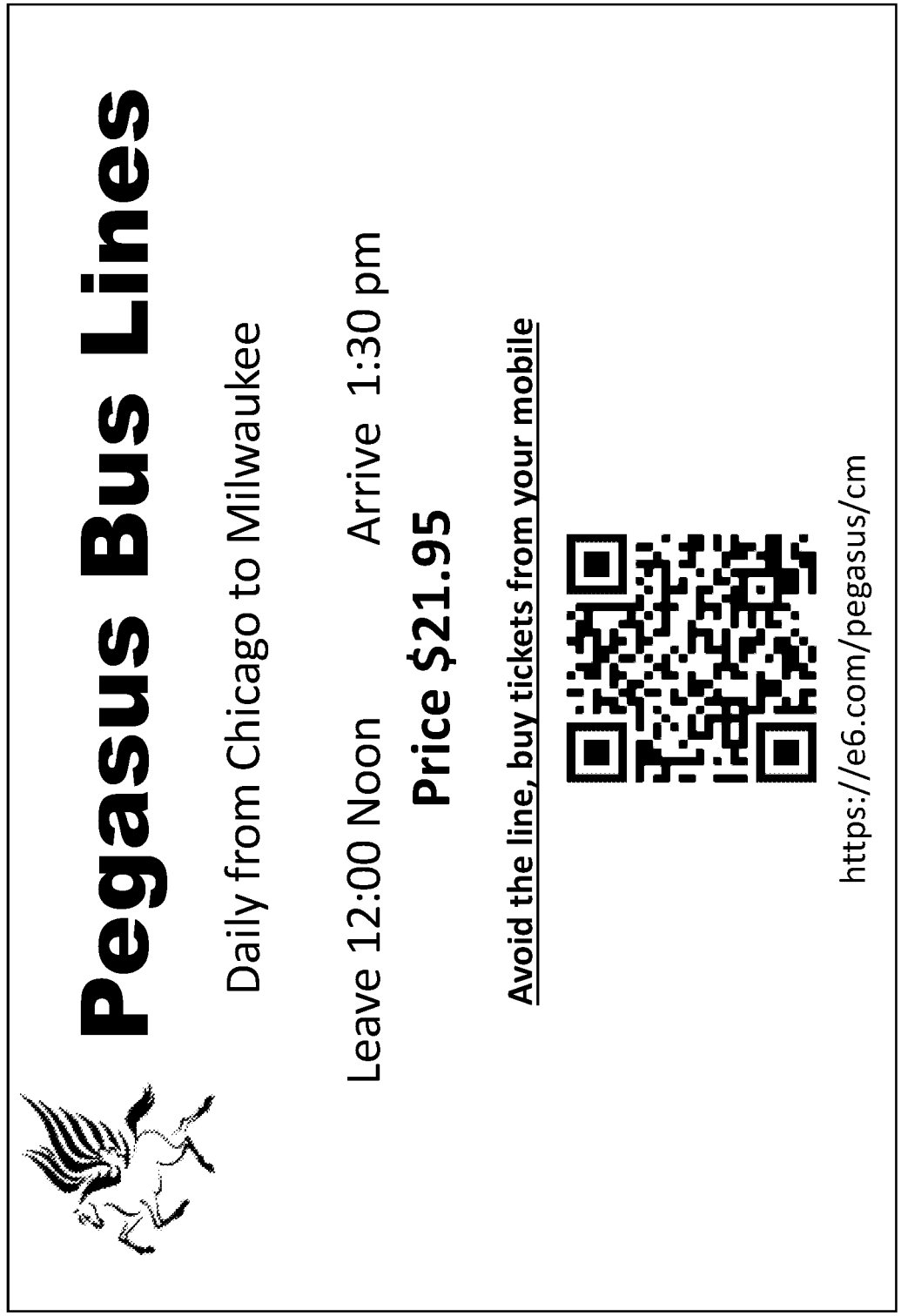

FIG. 30 shows a bus company using a poster as a ticket vending kiosk (scenario for E6).

Figure 31:
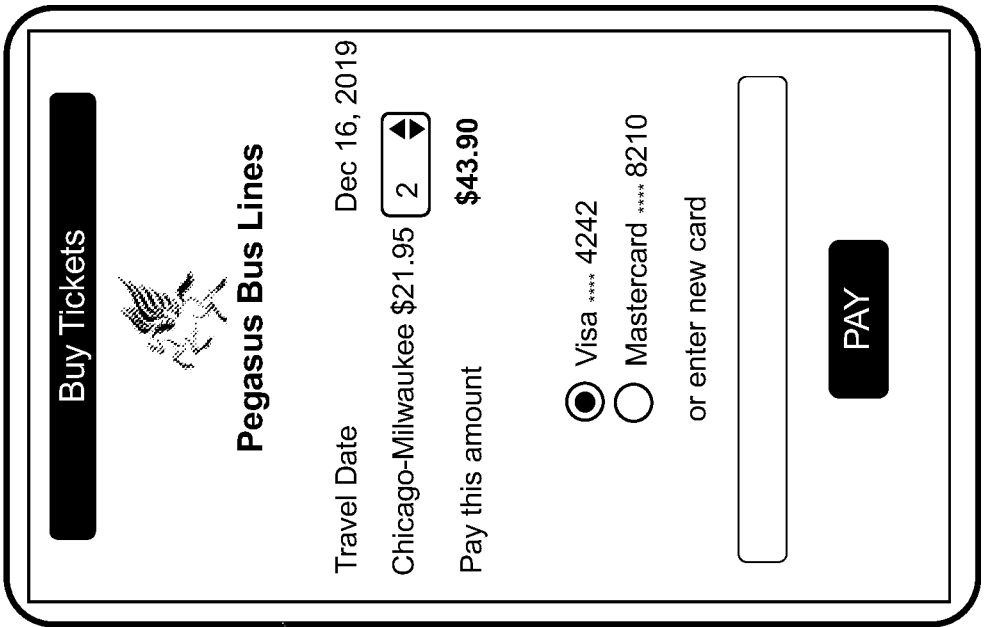

FIG. 31 shows the JSON for a payment request and the payment screen for a ticket.

Figure 32:

FIG. 32 depicts the delivered tickets and the app for their verification.

Figure 33:
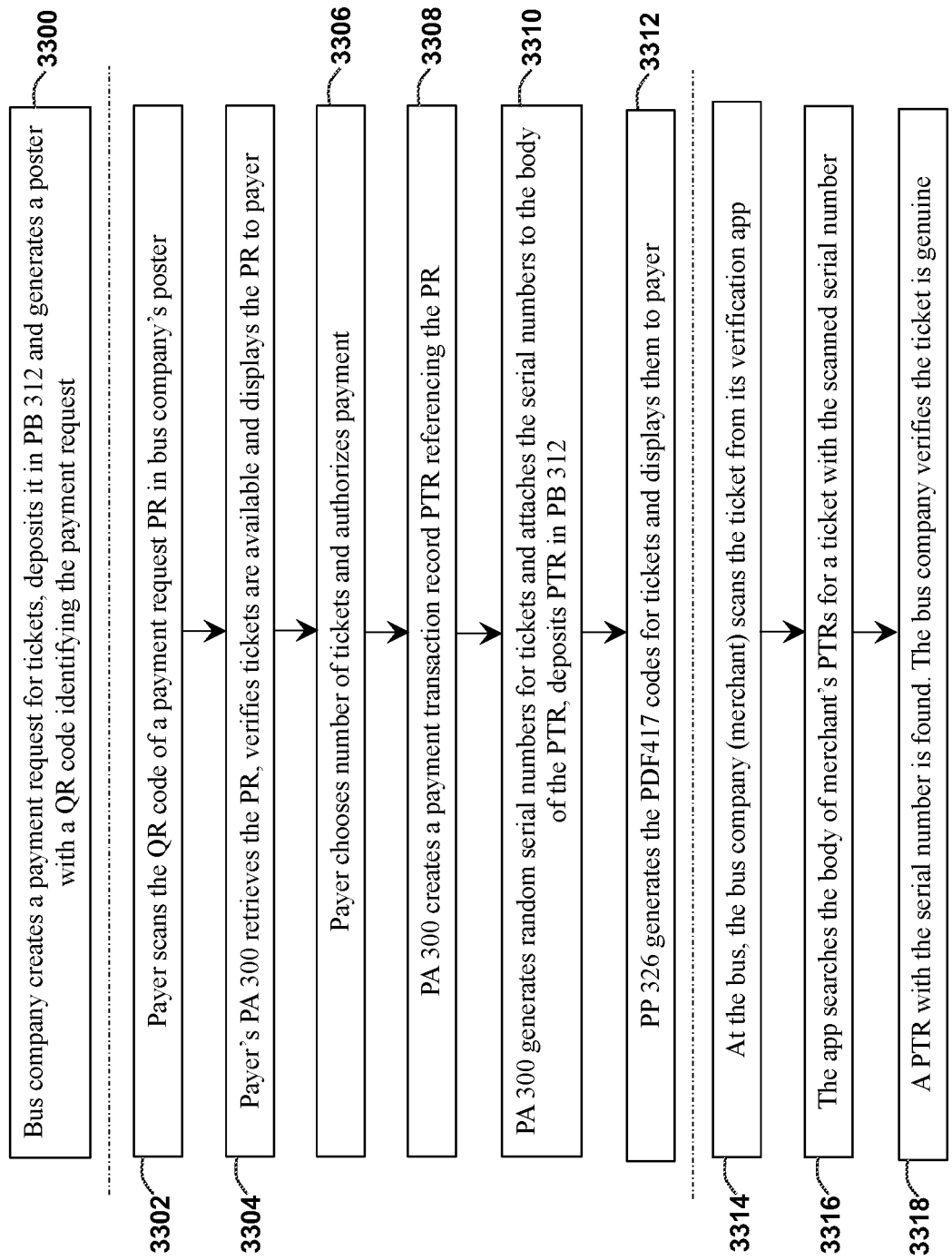

FIG. 33 depicts the process flow in E6.

DETAILED DESCRIPTION OF THE INVENTION

Structure of the Invention

Figure 3:
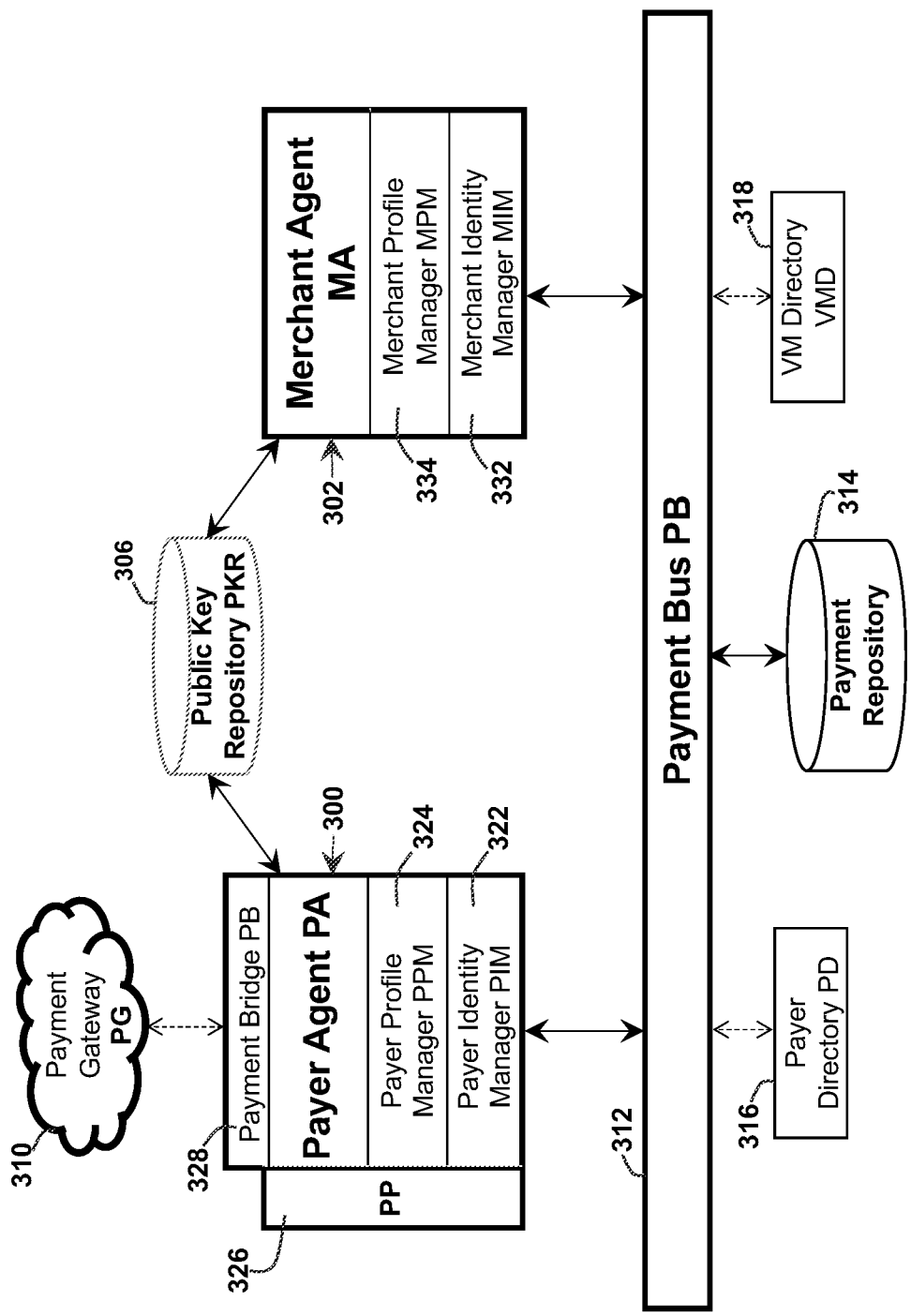
FIG. 03 is a schematic that shows the structure of our invention and its major components.

Our invention, embodiments of which we refer to as a Payer-centric Payment Systems or PCPS, comprises the following subsystems as depicted in FIG. 03:

1. one or more Payer Agents PA 300, where a given PA 300 acts as an agent for one or more payers and manages all aspects of a given payer's interaction with the PCPS,
2. one or more Merchant Agents MA 302, where a given MA 302 acts as an agent for one or more merchants and manages all aspects of a given merchant's interaction with the PCPS,
3. a Public Key Repository PKR 306 that stores public keys of a PCPS's payers and merchants so that payers and merchants can exchange—if they so choose—encrypted private messages with each other within the body of payment messages,
4. a Payment Bus PB 312 that acts as a store-and-forward conduit and enables parties connected to the PCPS to exchange payment-related messages with each other,
5. a Payment Repository PR 314 that acts as the storage cache of the PB 312 and stores active payment requests, resolved payment requests, and payment transaction records. Some embodiments store the pending and resolved payments in physically separate databases, Pending Payment Repository and Resolved Payment Repository, while others may store them as different tables in the same database,
6. a logical Payer Directory PD 316 is simply a directory of the identities of all payers recognized by a PCPS embodiment. In some embodiments it may be physical and explicit, whereas in others, it may be implicit and defined by routing tables and payer identities maintained inside payer agents, and
7. a logical Merchant Directory MD 318 is simply a directory of the identities of all merchants recognized by a PCPS embodiment. Much like the payer directory, a merchant directory may be explicit or implicit and we will discuss them both when we discuss the address space of a PCPS.

Payer Agent

A payer registers with a PCPS through a Payer Agent PA 300 of his or her choice and the agent is responsible for providing all capabilities that enable that payer to conduct payments through the PCPS. These capabilities include, but are not limited to, registering and authenticating the payer, presenting payment requests directed to that payer, managing and monitoring that payer's payment sources (such as credit cards, bank accounts etc.), completing payments for that payer, and depositing that payer's payment transactions into PB 312.

Figure 4:
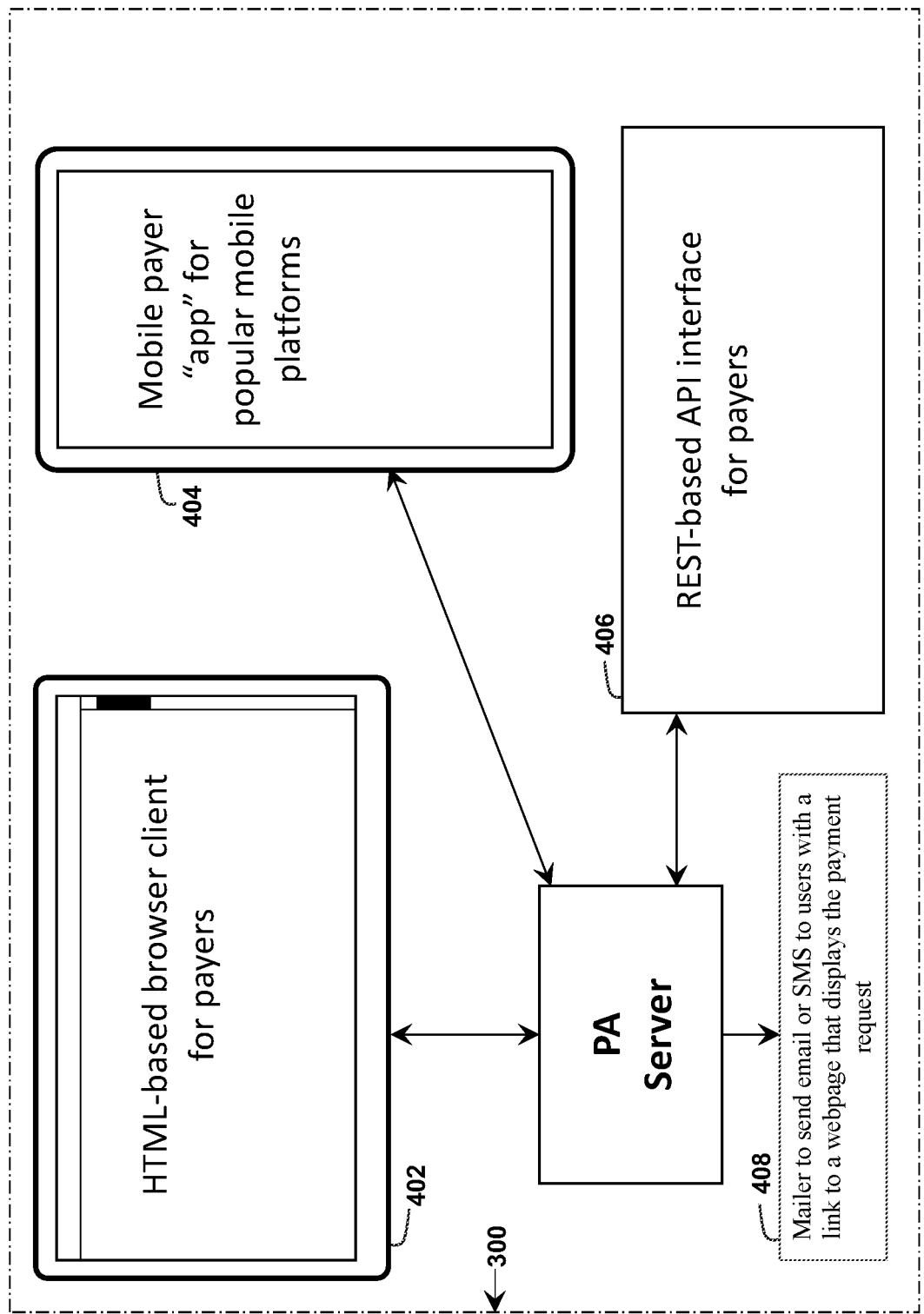
FIG. 04 depicts different technical architectures for Payer Agent as used in some embodiments.

In one embodiment, the PA 300 comprises a web server and several different types of clients (see FIG. 04). A PA server serves a browser client 402, a mobile client or app 404, an API endpoint for programmatic access 406, and also a mailer 408 to email (or SMS) a link to a webpage that displays a payment request. As an example, assume that a customer, angela@elfpoint.com, has just shopped at Franks Store. To charge her, the store would place a payment request addressed to her in the payment bus. Her PA 300 can deliver the payment request to her through a browser client 402 on a PC, through an app 404 on her mobile device, or can deliver it as JSON through an API endpoint 406 (to, say, her spreadsheet or accounting software). Based on Angela's preferences, it can use the mailer 408 to send her an email with a link to a webpage that displays the payment request.

The Payer Identity Manager PIM 322, a subcomponent of PA 300, is responsible for managing the identity of the payers registered with that PA. Besides well-known processes of registration, login and multi-factor authentication, a given PIM may also provide auxiliary identities (e.g., phone number) and aliases for its customers. In one embodiment, a PIM 322 uses passwords and session cookies to authenticate session-based access, and OpenID Connect with OAuth 2.0 for registering API clients for programmatic access with API tokens. Payer accounts may have roles with specific access privileges. For example, payers can authorize their auditors and tax preparation software to access a part of their data. The PIM is responsible for managing payer accounts and roles, and imposing authorization rules when anyone accesses PA 300.

Figure 5:
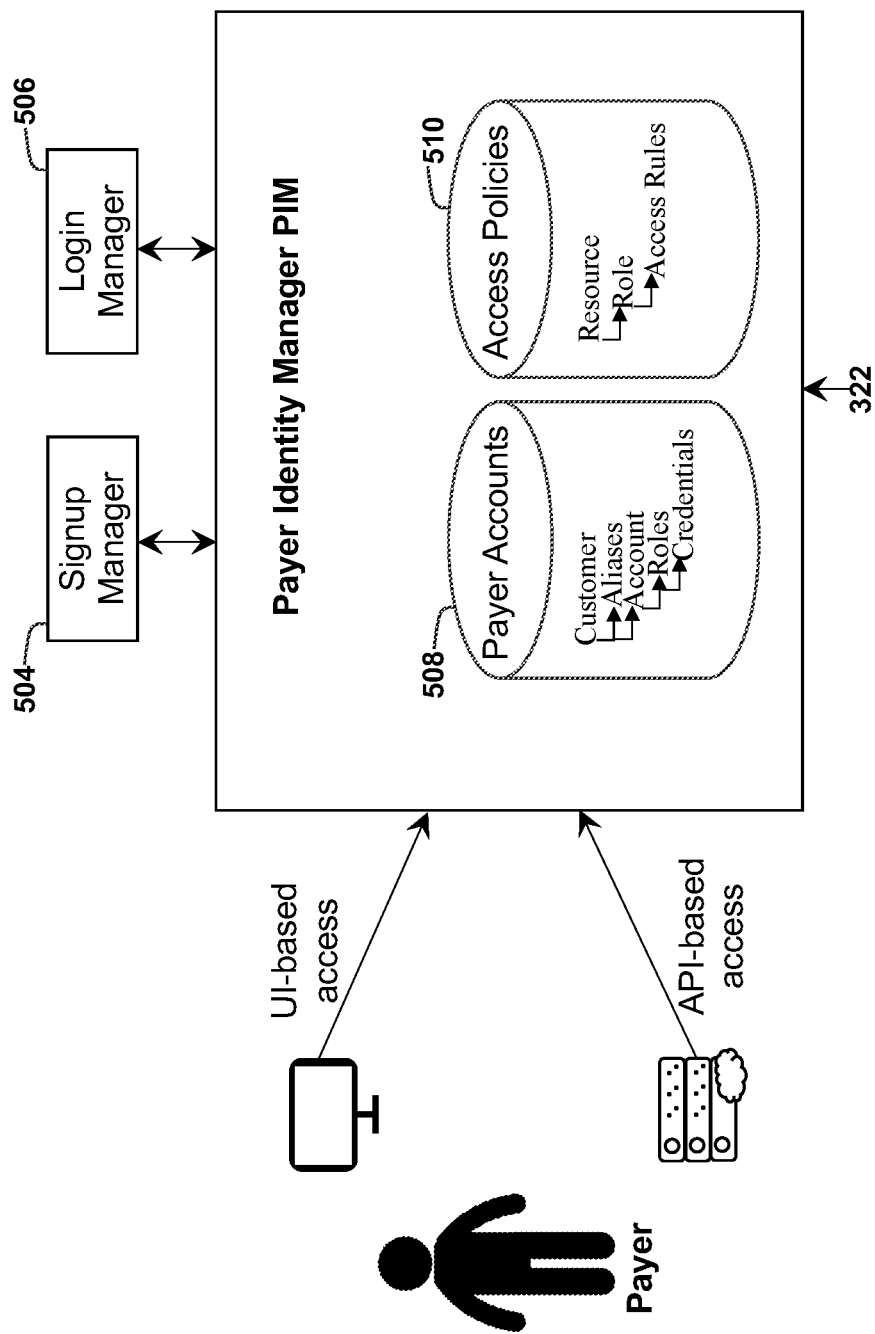
FIG. 05 is a schematic of the Payer Identity Manager PIM.

FIG. 05 is a schematic of a PIM 322 from one of the PCPS embodiments. All accesses to the PA 300—whether through a user interface or through APIs—go through the PIM which checks the access credentials against a database of Payer Accounts 508 and a database of Access Policies 510. If improper or no credentials are presented, the user is directed to the Signup Manager 504 or Login Manager 506 or presented with an appropriate error message.

The Payer Profile Manager PPM 324 is responsible for collecting and managing the customer's profile. The customer profile includes basic information about the customer including but not limited to name, phone numbers, aliases, shipping addresses, payment sources such as cards and bank accounts, as well of customer preferences including, but not limited to, where to deliver what types of payment requests, what types of payment alerts to provide, when to inform or warn of impending payments and so forth.

The Payment Presenter PP 326 is responsible for formatting and presenting a payment to a payer. Unlike the MCP paradigm where a merchant may implement a specific payment interface, the PCP paradigm must cater to many different types of merchants. For example, a restaurant may want the payment request to include a field for its customers to add tips; an eCommerce vendor may need the payment request to prompt customers for a shipping address; or a store may want the payment request to include a field where the customer can provide feedback about their shopping experience. To cater to all these cases, PP 326 depends on both the merchant profile (discussed below) as well as the payer's profile. For example, a payer's profile may direct that all payments be presented in Canadian dollars; a merchant profile may direct that all payment requests include an extra field for payers to add a tip to the payment.

F FIG. 07 is a schematic showing some architectures for PP 326 to obtain directives from a merchant or merchant Agent in presenting its payment requests to payers. The approaches shown are illustrative, not exhaustive. The simplest approach is 700 where the payment request itself includes merchant directives in its body. 704 depicts a flexible, but more complex approach where the request includes an API-endpoint (potentially controlled by the merchant's IT systems) that PP 326 can call in order to render parts of the payment screen. 702 is another approach where PP 326 retains control but takes directions in real-time from the MA 302. Embodiments provide examples.

Payment Bridge PB 328 is an abstraction layer between PCPS and third-party Payment Gateways PG 310, so that a PCPS is loosely coupled to the internal details of payment gateways. In some embodiments, the PB 328 is implemented as a set of drivers for a range of payment gateways such as Stripe, PayPal, Payment Tech etc.

Merchant Agent

A merchant registers with a PCPS embodiment through a Merchant Agent MA 302 and the agent is responsible for providing all capabilities that enable that merchant to accept payer-centric payments through the PCPS. Such capabilities include but are not limited to authenticating the merchant, placing the merchant's payment requests into the Payment Bus PB 312, providing the merchant with information about active and resolved payment requests, and managing the merchant's account with the PCPS. In some embodiments, the MA 302 provides sophisticated data analysis tools such as charts, reports, seasonal sales analysis, predictions and so forth. An embodiment may also provide tools to export data to third-party packages.

In one embodiment, the MA 302 comprises a web server and several types of clients as depicted in FIG. 08. The MA server serves a browser client 802, a mobile client or app 804 and an API endpoint 806 that accepts payment requests programmatically from merchants. The web client 802 and mobile client 804 enable small merchants to manually create payment requests such as the ones in 1402 (FIG. 14) and 2002 (FIG. 20). The API endpoint 806 enables larger and eCommerce merchants to create payment requests such as the ones in FIG. 23 and FIG. 28.

The Merchant Identity Manager MIM 332 is responsible for managing the identity and login credentials of a merchant. A merchant may own multiple accounts with different roles and privileges. For example, a small merchant may have a simple username and password with all privileges, whereas a chain store with several outlets as well as a website may have accounts with many roles such as store manager, branch manager, checkout clerk, website manager etc., who may not only have passwords for login and session-level authentication, but also API tokens for programmatic access. The MIM 332 is responsible for creating and managing merchant accounts and imposing authentication and authorization rules across all merchant access to a PCPS. In one embodiment, MIM 332 uses OpenID Connect with OAuth 2.0 for managing merchant accounts and distributing API access tokens.

FIG. 09 is a schematic of a MIM 332 from one of the PCPS embodiments. All accesses to the MA 302—whether through a user interface or through API—go through the MIM 332 which checks the access credentials against a database of Merchant Accounts 908 and a database of Access Policies 910. If improper or no credentials are presented, the merchant is directed to the Signup Manager 904 or Login Manager 906 or presented with an appropriate error message.

As mentioned earlier during our discussion on Payment Presenter PP 326, unlike the MCP payments where the merchant controls how the payment is presented to the payer, with our invention, the merchant depends on PP 326 for how the payment request is presented to the payer. For this, the PP 326 depends on both the payer's preferences (managed by Payer Profile Manager PPM 324) and the merchant's profile, managed by the Merchant Profile Manager 334.

The Merchant Profile Manager MPM 334 is responsible for collecting the merchant profile information. It uses a question-answer paradigm to help the merchant specify the customizations that the merchant needs in how the PCPS embodiment manages the payment process for that merchant. Further, the merchant profile may also provide input to the Payeent Presenter PP 326 on how to display payment requests from that merchant. FIG. 10 is a screenshot of a merchant profile from an embodiment called Elfpoint which we will revisit later.

Encrypted Private Messages

The Public Key Repository PKR 306 enables merchants and payers to exchange encrypted private data in the body of payment requests. With authentication and secure socket layer—or https—access, a PCPS can be state-of-the-art secure. However, if payers and merchants desire privacy in exchanging data related to a payment—for example, a certificate of originality for a rare artwork that's paid through a PCPS—our invention provides for that.

When a payer registers with PA 300, it creates a cryptographic sandbox for that payer. The sandbox generates a public-private keypair for that payer, retains the private key and deposits the public key into PKR 306. A payer can specify (as part of preferences) that merchants send only encrypted messages to that payer. Merchants can use the payer's public key to encrypt messages to that payer in the body of payment requests. PA 300 delivers encrypted message bodies to the payer's sandbox to be decrypted using the payer's private key.

This is shown in FIG. 11, where a merchant creates a payment request 1100 for a payer P1 with a standard header 1102 and an encrypted body 1104 (payment requests are described below). Merchant Agent MA 302 places this request on the Payment Bus PB 312. When the payment request 1100 is delivered to the Payer Agent PA 300, its Payment Presenter PP 326 delivers the header 1102 to the customer as it normally would; it delivers the encrypted body 1104 to the payer's sandbox 1106, which alone can decrypt 1104. In one embodiment, the sandbox 1106 is implemented as a desktop application to which PP 326 delivers the message 1104. The application stores its private key locally and uses it to decode the private message.

The Payment Bus

The Payment Bus PB 312 serves four functions that are critical for a robust and scalable payer-centric payment system. First, it acts as a data conduit across different parties within a well-defined name or address space so that payers, merchants and payment messages all have unique identities with which they can be referenced and retrieved. As such, merchants—operating through different merchant agents, possibly controlled by different organizations—can request payment and obtain payment confirmation from payers—operating through different payer agents, possibly controlled by different organizations. A merchant or payer can switch agents—and new agents can join a PCPS embodiment—without affecting the payment flow.

Second, the payment bus externalizes a payment request as a persistent object in Payment Repository PR 314, so the payment request is no longer dependent on the merchant's cash register or website for its fulfillment. The request can be accessed and paid from anywhere.

Third, PB 312 acts as an event and data bus that delivers payment messages to concerned parties as and when the messages arrive. This helps maintain a synchronous payment flow across the PCPS, without the agents polling a central repository or maintaining point-to-point contact.

Fourth, PB 312 is a store-and-forward pipe that delivers payment messages on demand. Hence it is tolerant of system and network failures; further, externalization with persistence means that a payment request can be created by a PA and (later) "claimed" by a payer. Contrast this with today's Internet payments where a network failure can result in the failure of a transaction or can result in duplicate transactions. We are all familiar with messages such as "this action may make take a long time. Please do not close the browser or press the browser's back button" when we click the "pay" button for an eCommerce transaction.

As such, the payment bus provides an open infrastructure for an "internet of payments" as opposed to walled-garden payment systems of today. We have kept the payment bus intentionally simple so it can be a very general: it acts as a synchronous store-and-forward and as an (asynchronous) on-demand retrieval mechanism for payment messages. It is stateless, so agents have to manage state through their payment records.

Payment Messages

PB 312 stores and transmits discrete pieces of information are interchangeably called messages or records. One PCPS embodiment implements two types of records: Payment Requests PR and Payment Transaction Records PTR. While these records are structured objects within PA 300 and MA 302, they may be serialized with respect to PB 312. We note that serialization refers to the conversion of a structured object into a standards-based representation so that it can be transmitted from one system to another. In some embodiments, payment records are serialized into JSON (JavaScript Object Notation, an established standard), though other embodiments may serialize them to other standards. PRs are used by merchants to request a payment, and PTRs are used by payers or payer agents to confirm a payment.

PRs and PTRs are important but not exhaustive of the kinds of information that need to flow through a payment bus to support payment-centric payments. With our embodiments we show how a number of scenarios can be supported with just these two. Other embodiments may use additional types of records to handle scenarios such as refunds, deposits, credit holds etc. We expect a wide range of payment record types to emerge as new types of financial instruments are introduced by banks, credit card companies and other players in the financial services industry.

Payment Requests or PRs have a header and a body. The fields and values in the header are unrestricted though many embodiments of this invention recognize the following fields and their associated semantics: type, request ID, merchant ID, customer ID, requested amount, currency unit, expiration date, transaction ID, status, recurring flag, recurrence parameters, add tips, taxes, information request, tax deductibility and fulfillment count. The body is meant for the merchant or merchant agent to provide information to the payer or payer agent and is not processed by PB 312. As discussed earlier, the whole or part of the body may be encrypted for private communication between a merchant and a customer or between their respective agents.

As an example, let's consider a payment request PR shown in FIG. 28 in JSON representation from a PCPS embodiment. It has the following semantics: this is a payment request from merchant ESPN, to customer angela@elfpoint.com for an amount of 19.95 USD, the request is currently active but will expire on Dec. 15, 2019. It is a request for a recurring payment, and the payment starts on 12-14-19 continuing in perpetuity, and can be cancelled by visiting a specified link. The request for the recurring billing will be considered fulfilled if approved once by the payer. The request has a body with additional information.

When a payment request PR is paid by the payer, PA 300 creates a Payment Transaction Record PTR, adds the PR's ID to the PTR and sends both the PR and the PTR to the payment bus PB 312. The purpose of the PTR includes but not limited to (a) providing the Merchant Agent MA 302 a confirmation of the payment, (b) enabling the Payer Agent PA 300 keep track of the details of the transaction, and (c)

exchanging any information with the merchant (e.g., a shipping address). In one embodiment, a PTR has three main parts—a header, a tracker and a body. The header is not encrypted, the tracker is typically encrypted so that it is only intelligible to the Payer Agent PA 300, and the body is for information exchange between the payer and the merchant and could be encrypted. FIG. 15 (1504) shows the JSON representation of a PTR. The header says that it is a transaction record confirming the payment for a specific payment request with an ID of 1127745653 from a merchant called Franks Store to a customer called angela@elfpoint.com for a payment amount of 29.95 USD incurring a transaction commission of 1.21 USD. Further, the transaction is confirmed by the PCPS embodiment with a confirmation number and a timestamp.

When Merchant Agent MA 302 for Franks Store sees this PTR, it would consider the payment request with the ID 1127745653 paid and credit Franks Store's account for the payment. It is worth noting that neither Franks Store nor its Merchant Agent has any knowledge of the payment source (credit card, bank account or whatever) that was used by the payer as that information is not in the header but in the tracker field that is encrypted for and by the PA 300.

The body of the PTR in 1504 (FIG. 15) is empty, but its tracker tracks or contains information about how the payment request was paid and is intelligible only to the Payer Agent PA 300 because it is encrypted. It may be created by the PA 300 itself or by the Payment Bridge PB 328. It specifies that the name of payment gateway PG 310 that was used for completing the payment, the confirmation code provided by the payment gateway, the internal token for the payment source used, and the nickname by which the payment source is known to the payer.

A payment request that does not have the status of "active" is considered "resolved." Either it has been paid, declined, canceled by the merchant, expired, abandoned or has some other status. In some embodiments (e.g., E1 and E6), the "fulfillment_count" parameter may control when a payment request is considered resolved. In some embodiments, the payment repository PR 314 comprises two logically and/or physically separate repositories called Active Payment Repository and Resolved Payment Repository for more efficient processing. In others, they may be simply different tables in the same physical repository.

Implementing the Payment Bus

In a simple embodiment with just one PA 300 and just one MA 302 residing on the same server, the PB 312 can be implemented as a relational database for the payment messages and an event bus that broadcasts database events. PA 300 and MA 302 can subscribe to the event bus as listeners and be notified of database events and respond only to events that concern them. While not very scalable or secure, this may be adequate for a simple PCPS.

For an embodiment that has several PAs 300 and MAs 302 spanning hundreds of servers across the Internet, PB 312 can be implemented as a distributed, NOSQL database for resolved payment messages, and an in-memory database cache for pending payment requests, and webhooks to send specific PAs or MAs of fine-grained events and data. FIG. 12 depicts a payment bus using webhooks. In this embodiment, the PB 312 comprises an Internet server 1200 that has an in-memory database 1202 for pending payment requests, and a distributed NOSQL database 1204 for resolved payment requests and payment transaction records. Merchant Agents and Payer Agents register specific webhooks—i.e., URLs that accept HTTP POST messages—for events that concern them. On the arrival of incoming payment messages, server 1200 first stores the message in one of 1202 or 1204, looks up what event the message triggers, and then sends a HTTP POST to the webhook registered for that event in the Webhook Directory 1206. While we have described two solutions, many other technologies can support an Internet-wide payment bus PB 312. REST hooks, Websockets, Pub-Sub, Server Sent etc. are some possibilities.

Address Space

An address space or namespace defines the context within which the identity of some entity is defined and where the entity is uniquely addressable. For example, a filesystem in a computer is an address space that uniquely qualifies each file within a hierarchical directory structure; the Domain Name Service (DNS) of the Internet defines a highly distributed and hierarchical address space, in which any domain, subdomain or a webpage is uniquely addressable. For smooth payment flow in a PCPS embodiment, it is necessary that a PCPS provide an address space in which payers and merchants can clearly identify each other by their public identities. In simple embodiments, the address space may be nothing more than a flat, PCPS-wide directory of payers and merchants, ensuring that their IDs are unique at the time of registration. If the embodiment has only one Payer Agent PA 300 and only one Merchant Agent MA 302, their respective identity managers PIM 322 and MIM 332 would also be the logical Payer Directory 316 and the logical Merchant Directory 318 respectively. If there are multiple payer agents and merchant agents, then the union of their respective PIMs and MIMs would constitute the logical payer and merchant directories with an additional check at the time of registration to ensure that payers or merchants do not have duplicate registrations across agents.

A hierarchically organized address space is more common and scalable. In the address space shown in FIG. 13, merchant agents and payer agents are trusted entities, and their identities are simply their IP addresses maintained by the payment bus in a routing table. The merchants are identified by domain names, which are by definition unique. A payer is assigned an email ID at registration where the email ID is part of the domain of the payer agent that registers the payer and is therefore unique. In this case, the naming convention used by domain names and email IDs constitute implicit merchant and payer directories PD 316 and MD 318.

Although a simple embodiment could just inform all agents whenever a new payment message arrives at PB 312 and let an agent determine if the message concerns that agent, that would be neither secure nor efficient. Most embodiments maintain an association list specifying which payer or merchant is associated with which agent, though in an address space such as the hierarchical one shown in FIG. 13, no such list is necessary for payers since the structure of an email ID automatically specifies its agent association. Note that, strictly speaking, such association lists are a matter of efficiency and not an integral part of an address space per se.

In our invention, it is not just the payers and merchants who are uniquely identifiable, but also payment messages that they send to each other. Since all payment messages pass through the Payment Bus 312, in some embodiments, it is most efficient to assign an ID to payment messages when they are first reach the Payment Bus 312. In other embodiments, each merchant agent and payer agent may assign an ID that is unique within that agent's address space, and prefix it with that agent's own ID, so that the message's ID is unique across the PCPS.

Why have many PAs and MAs? Our invention aims to provide an open infrastructure for payments and does not subsume any particular business model. We imagine that different agents will cater to different market niches, geographies or different class of payers and machines. For example, one merchant agent could cater to merchants of a certain type while another may cater to only payers in a certain geography. Similarly, one PA may cater to payers paying with prepaid credit, another to payers paying with PayPal, and another may specialize in discounts and coupons. Our invention is agnostic about the underlying business dynamic.

Indicial Interfaces and Indicial Input/Output

For a merchant device (such as a cash register, vending machine or a website) and a payee device (such as a mobile device) to interface, a number of modalities are available. At one extreme is the merchant device flashing some data and the user entering that data into their mobile device manually; at the other extreme is a wifi or Bluetooth connection between the two devices. The former is safe but cumbersome; the latter can be cumbersome at best and dangerous at worst: in public places with hundreds of machines and wireless signals, not only is pairing between devices tedious, it can also open the device to rogue connections and malware.

We define an indicial interface or indicial input/output as any interface modality where a human can reliably ascertain the origin and destination of the interface. As such, a QR code, barcode, tone input/output etc. can be perceived by a human; NFC, while being invisible, is restricted by its extreme proximity requirement of a few centimeters. Although our invention is agnostic in terms of how customers interface with merchants, we believe that indicial interfaces are most suited for peer-to-peer interfaces for most real-world payment scenarios as they enable payers to ascertain the origin and/or destination of what they are interfacing with.

EMBODIMENTS OF THE INVENTION

Embodiment E0: A Prototypical Payment Scenario at a Store

Assume that embodiment E0 is offered as a service at the fictitious domain e0.com. Assume that a payer, Angela, has signed up with e0.com, through one of E0's payer agents called elfpoint.com and is assigned an email ID angela@elfpoint.com. Assume that she has added two cards as her payment credentials to her profile. Let us also assume that a merchant, a small convenience store called Franks Store, has signed up with e0.com through one of its merchant agents MA 302. The Merchant Profile Manager MPM 334 will obtain the merchant's name, logo, bank account, and other information through a dialog similar to the one in FIG. 10.

Assume that Angela is at Franks Store's cash register to check out. The merchant logs into e0.com via a browser, uses the MA 302's browser interface 802 to create a payment request 1402 as shown in FIG. 14. 1404 is the JSON representation of the payment request. In other embodiments, the customer ID may be scanned from the customer's mobile device as a barcode or entered by the customer through a keypad device.

MA 302 now places the payment request PR in the E0's Payment Bus PB 312, which delivers it to Angela's payer agent PA 300. PA 300 consults Angela's profile and finds that her delivery preference is her mobile app, so the PR is delivered to her mobile app 404. The Payment Presenter PP 326 presents a payment request based on both merchant's and payer's respective profiles. PP 326 consults Payer Profile Manager PPM 324 to obtain the two cards stored by Angela in her profile; it also consults the Merchant Profile Manager MPM 334 to get Franks Store's logo. 1502 (FIG. 15) is the screenshot of the PR as presented to Angela.

To fulfill the payment request PR, Angela can choose a card from her profile or enter a new card. Her payment source and authorization are delivered by Angela's app 404 to PA 300. PA 300 sends the merchant ID and the payment source to a Payment Gateway 310 through its Payment Bridge PB 328. If the payment is successfully completed, PG 310 returns a payment confirmation and PA 300 creates a Payment Transaction Record PTR with a reference to the payment request ID and merchant ID, the transaction amount, and the confirmation code provided by PG 310. 1504 in FIG. 15 shows the PTR. PA 300 deposits the PTR in the Payment Bus PB 312 which PB 312 routes to Merchant Agent MA 302. Now MA 302 verifies that the payment amount in the PTR matches the amount billed in the PR and that PTR has a confirmation code. Satisfied, MA 302 changes the status of PR as from "active" to "paid."

FIG. 16A depicts the steps that E0 goes through in the above scenario. FIG. 16B provides an alternate depiction in terms of process flow: MA 302, PB 312 and PA 300 are shown left to right and the sequence of the process steps from top to bottom. FIG. 16C provides yet another view of the process and data flow as seen by MA 302, PB 312, and PA 300. Each arrow represents the direction of data flow or an action and the steps are numbered. "APR⇒RPR" stands for the modification of the status field of a payment record from "active" to "paid."

Embodiment E1: Paying a Street Performer

Imagine tipping a street performer, a waiter in a food kiosk, or making a charitable donation to a roadside volunteer. In such scenarios, there is no formal payment request, and the payee and the payer typically do not know each other's identity. Assume that embodiment E1 is offered as a service at the fictitious domain e1.com. Payees register with e1.com as merchants and are provided a URL and a corresponding QR code that identifies them. A payee is free to display the QR code in any location. For such payees, E1 creates a persistent payment request which has the payee's identity, but no payment amount.

When a payer—who may or may not be registered with a PA 300 of the E1—scans the QR code from a mobile device, the payer is directed to the webpage or app location specified by the QR code and unique to that payee. If the payer is registered and logged in, the Payment Presenter PP 326 will retrieve the payer's stored payment sources and the payee's profile; if the payer is unknown, then he or she is simply shown the merchant's page, and the payer can pay by entering a credit/debit card or with the device supported payment system such as Apple Pay or Google Pay. FIG. 17 depicts screenshots from E1 and shows the payment request from a street performer as it is shown to an unknown payer (1702) and a logged-in payer (1704).

How does Embodiment E1 work? Shown below is the JSON representation of the payment request PR created by E1's Payer Agent PA 300 for the street performer.

```
{ "header": {
    "request_id": 4014605071,
    "merchant_id": "Street Comedian Joe",
    "fulfillment_count": "unlimited"
  }
  {"body": { "ack": "You made my day!"}
}
```

Notice that, besides the payee's identity, this payment request has very little. With no amount requested and no designated payer, this request can be captured by anyone. Note that the PR specifies that the "fulfillment_count" is 'unlimited'. This means that PR will stay persistent in PR 314 so that any number of payers can fulfill the same PR. However, each payment will create a new Payment Transaction Record PTR that references the same PR For each new PTR, the MA 302 will simply credit the payee's account with the amount in the PTR but leave the status field of PR as 'active' because the "fulfillment_count" is 'unlimited.'

Although very simple, this scenario illustrates one of the advantages of this invention. The street performer is able to accept electronic payment from an unknown passerby without possessing or operating any payment infrastructure and without interrupting his performance. Being payer-centric, once the performer sets up the payment request, payments are initiated and orchestrated by the payer with no overhead for the payee. Note that there is nothing special about the QR code itself—it is simply an easier-to-read version of the payee's URL.

E0 and E1 Combined: An Infrastructure-Less, Payer-Centric Cash Register

Embodiment E0 illustrated how a merchant can create a payment request for a specific amount directed to a specific payer. Embodiment E1 illustrated a payer identifying a merchant by their ID to make a payment. A trivial combination of E0 and E1 can be used as a simple cash register where a merchant can create a payment request as in E0 but without knowing the payer's ID and a payer can scan the (static) QR code of the merchant to retrieve the merchant's most recent payment request. Scenario 1804 (FIG. 18) shows a vendor displaying a QR code on a sheet of paper that simply identifies the merchant as in E1. The merchant creates a payment request for a specific amount as in E0, but with no payer ID. When a payer scans the merchant's QR code—a static ID—the payer agent retrieves and displays the most recent payment request by that merchant (the typical scenario for a cash register), thereby using a static merchant ID as a proxy for a dynamic payment request. FIG. 19 depicts the process flow.

This is another example of how payer-centric payments are advantageous to both customers and merchants. In the scenario described, a small merchant is able to transmit a payment request for a specific amount and accept an electronic payment from an anonymous payer without needing any payment infrastructure; the customer is able to pay a fly-by-night street vendor electronically without revealing his or her identity or payment credentials.

Embodiment E2: Paying at a Restaurant, Tips Included

Embodiment E2 supports restaurant payments: a scenario in which the payment amount is known, the payer's identity may not be known, and the payer may modify the payment request by adding a tip. Assume that our restaurant has integrated its cash register with Merchant Agent MA 302 through the latter's API interface 806 so that when a check is rung up, the cash register automatically generates a payment request PR which is placed in E2's PB 312. Now the restaurant can print the check with a QR code that identifies the PR In FIG. 20, 2002 shows the restaurant's MA 302; 2004 shows the printed check for our customer Angela.

To pay, Angela scans her check with her app 404 of E2 and her app 404 retrieves the PR from PB 312. PP 326 that serves her app 404 retrieves her stored cards from her profile; it also retrieves the restaurant's logo from Topaz Café's profile and notes that tips are applicable to its payment requests (see FIG. 10). Based on all this data, PP 326 generates a visual representation 2102 (FIG. 21) of the PR. When Angela adds a tip, chooses a card, and authorizes the payment, PA 300 completes the payment process depicted in FIG. 16A. PP 326 of Angela's PA 300 now confirms the payment, and—as instructed by the Topaz Café's profile (see FIG. 10)—prompts Angela to review the restaurant and accept coupons as shown in 2104.

This embodiment is an illustration of a much more flexible payment scenario where the customer does not just fulfill a payment request as given but modifies it by adding a tip from her own device. Note that Angela's identity and payment credentials were not shared with the restaurant, she did not have to wait for a waiter to swipe a card and bring her an invoice for her to add tips and the restaurant did not need any payment infrastructure such as card readers.

Embodiment E3: Paying for an Online Purchase

Imagine our customer Angela visiting a fictitious eCommerce website, kids-casuals.com, adding several items to her shopping cart and checking out. FIG. 22 is a screenshot of Angela's shopping cart. Imagine that kids-casuals.com accepts E3.com as one of its payment options. Instead of entering her credit card number and shipping address, Angela can check out by entering her E3.com ID and by ticking the box that allows E3.com to provide her shipping address to the website. When Angela checks out, the website creates a PR via E3's Merchant Agent's API-endpoint 806. The JSON representation of the PR 2302 is shown in FIG. 23. E3's MA 302 deposits the PR into E3's PB 312 which delivers it to Angela's Payer Agent PA 300 and Angela's PA 300 displays it on her mobile app 404. Angela would pay this payment request from her mobile app 404 much the same way she would pay any other merchant.

Practitioners familiar with the state of the art might see some functional similarities between our invention and other commercially available systems like PayPal. Our invention as well as PayPal hide the payment source from the payee. However, the similarities end there. Structurally and architecturally, as a payment system, PayPal is analogous to a computer whereas our invention is analogous to the Internet. First, the former creates a proverbial "walled garden" and requires both the merchant and the payer to be inside the walled garden as its clients. Second, when a payer initiates a payment from an eCommerce website, the eCommerce website invokes PayPal for the customer to authorize the payment. At that point, the only glue that holds the eCommerce website, the customer's website session and the PayPal session are transient website cookies. As such, all these actions have to take place on the same device and within the same browser almost synchronously (or within a cookie timeout period).

Figure 1:
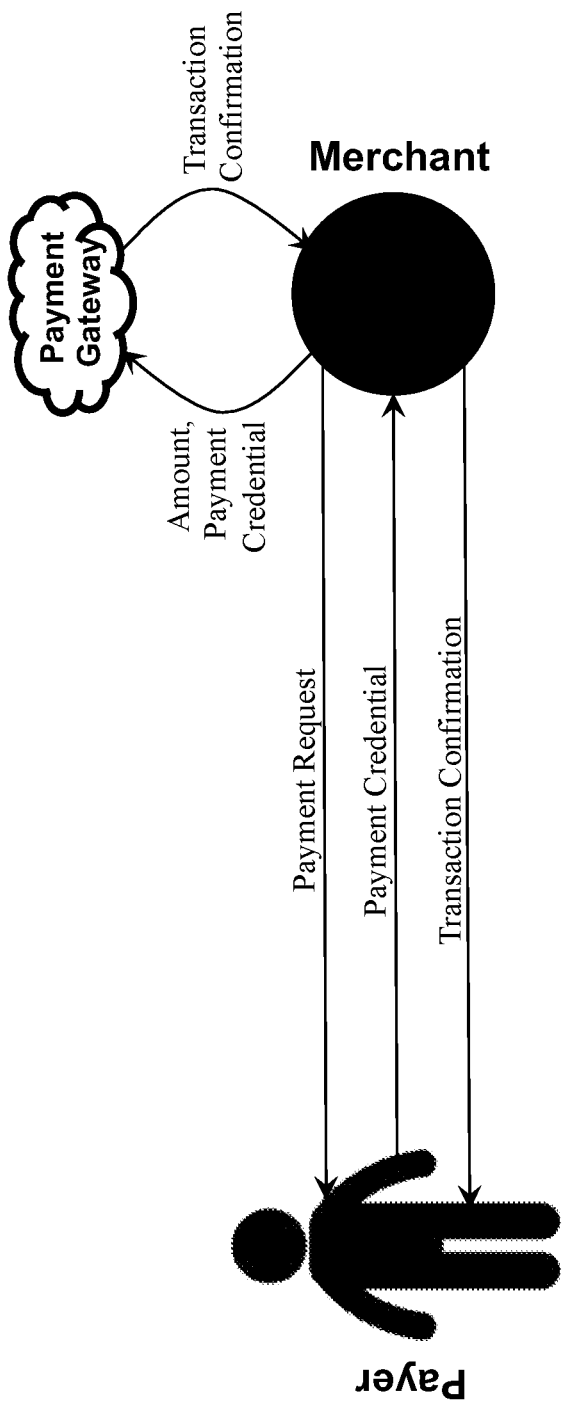
Figure 2:
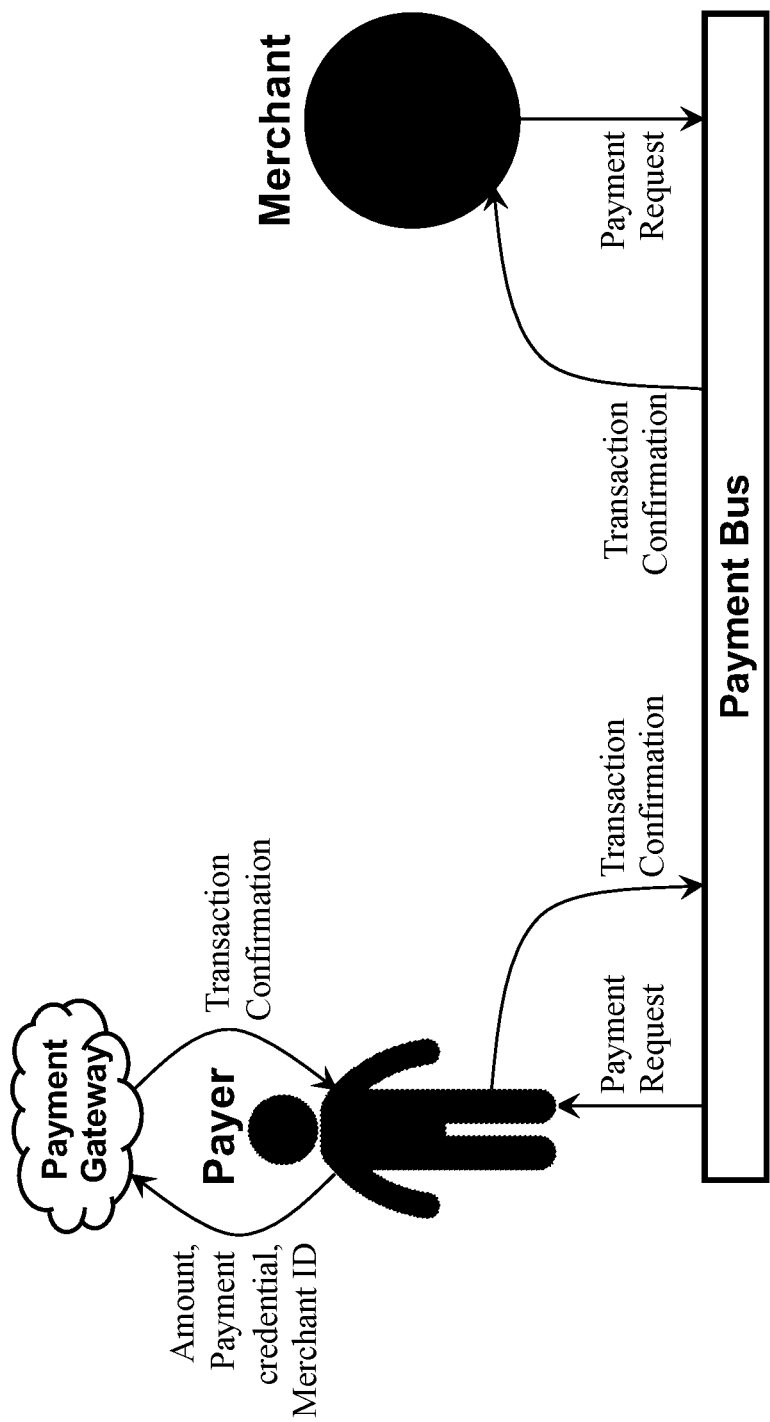

In contrast, our invention externalizes a payment request with a unique ID as a persistent, first-class object through its payment bus. And the technical architecture of our invention enables multiple merchant agents and payment agents that can post and retrieve payment messages from anywhere on the Internet. This means that a merchant can create a payment request from one device through MA 302; the request can either be sent to the payer (via the payer's ID) or retrieved by the payer (via the payment request ID) from another device through Payer Agent PA 300. As such, our invention creates what might be seen as an Internet for payments where merchants, payers and payment requests can be uniquely addressed, where many merchant agents and payer agents can coexist, where any payer can pay any merchant through the payment bus without requiring both parties to be inside a proprietary walled garden. Compare FIG. 25—a schematic of PayPal—with FIG. 02, a schematic of our invention.

Embodiment E4: Claiming a Payment from a Website, Vending Machine or Retail Store In embodiment E4, we focus on several payment scenarios that become possible when a payment request is externalized so that the payer can pay by claiming the request. FIG. 24 is a screenshot of Angela's shopping cart from E3 but adapted for E4. Unlike in E3 where Angela had to enter her ID to receive the payment request, E4 shares the ID of the shopping cart with the customer. Much like in E3, the merchant's website creates a payment request PR via E4's API-endpoint 806. FIG. 23 (2304) shows the JSON representation of the PR. Note that the PR's request_id ("KC-22847") is the same as the shopping cart ID that E4 shared with Angela in FIG. 24. E4's MA 302 deposits the PR into E4's payment bus PB 312. However, unlike with E3, this PR is not directed to any payer (the customer_id is null), so the PB 312 simply saves it in the payment repository PR 314 but has no payer to forward it to.

How does Angela pay? FIG. 26 shows screens 2602 and 2604 of E4's payment app 404. Since the merchant has shared Angela's shopping cart ID, she can simply enter or scan the cart ID through 2602 and have her Payer Agent PA 300 retrieve it and present it to her with the Payment Presenter PP 326 as in 2604. As noted earlier, the merchant can provide input to PP 326 on how to present a payment request to a customer. In FIG. 07, we presented different architectures for how PP 326 and the merchant could interact. Embodiment E4's PR 2304 (FIG. 23) specifies an API endpoint for PP 326 for getting merchant input for presenting this PR to the customer. PP 326 uses the architecture shown in 704 to obtain the content and formatting instructions for Angela's cart by calling this API endpoint (with the cart_id as a parameter). It is as if Angela's cart has jumped off the merchant's webpage into Angela's mobile app 404. In this scenario, the eCommerce site and the cart could be on one device (say, a PC) and Angela could retrieve the cart on another device and pay for it without involving the merchant at all.

E4 caters to a very general scenario where a payer claims a payment request and pays for it in any manner the payer chooses. We now illustrate how E4 caters to other scenarios. Imagine a vending machine that enables customers to select multiple items and then pay with a card. Much like the payment machinery at a store, such vending machines need a card reader and a wide-area data connection to contact a payment gateway. With our invention, a vending machine can eliminate the card reader and act more like a website where the customer's snack selection is tantamount to a shopping cart that can be claimed and paid for from a mobile device as in E4.

FIG. 27 shows a conventional vending machine 2702 with a built-in card reader 2704. It also shows a modified version 2712 where the card reader has been replaced by a display 2714 and/or a cheap LED counter 2716 and/or a contactless NFC output device 2718. When the customer has made her snack selection, instead of expecting a payment through a card reader 2704, the modified machine 2712 does exactly what the eCommerce website did in embodiment E4. The machine creates a payment request PR for the customer's snack selection via E4's Merchant Agent's API-endpoint 806 and provides the ID of the payment request as a QR code on the display 2714, and/or as a character string on the LED counter 2716 and/or as an electronic signal that can be picked up by a customer's mobile device from the NFC output device 2718. This enables the customer to claim the payment request with her app 404 and pay from the app (as in FIG. 26). When the customer pays, the customer's payment transaction record is deposited by the customer's PA 300 into PB 312 which routes it to the vending machine's MA 302. After MA 302 verifies the payment, it informs the vending machine, which dispenses the snacks.

Consider a retail scenario shown in FIG. 18. At present, stores use merchant-centric payments: once a sale is rung up, the payer would swipe her card through a card reader 1824, an input device that reads the customer's credentials to complete the transaction through the store's payment infrastructure. With E4, the store would replace the card reader with an output device, a display 1834. When a sale is rung up, much like the website or the vending machine, the store's cash register creates a payment request PR and provides its ID as a QR code or NGC output on the display 1834. The customer scans this code and pays from her own app 404.

The above scenarios show the flexibility of our invention. When a payment transaction is externalized, it is no longer coupled to a transient internal record belonging to a cash register, vending machine or an eCommerce database, but is turned into a first-class object with a unique ID that can be accessed and fulfilled from anywhere through any payment service. E4 shows that a customer-centric payment system is more convenient and secure for the customer and is also cheaper for the merchant. For example, a vending machine operator no longer needs a card reader and the security related to taking payments through unattended machines in remote places.

Embodiment E5: Automatic or Recurring Payments

In the background section, we discussed recurring payments as a major disadvantage faced by payers in the MCP paradigm. Specifically, since payers authorize these payments through merchants and not through card providers, authorizations for automatic payments are scattered across multiple merchants with the result that the payer does not have a consolidated view of all the merchants who are charging to that payer on a regular basis. It is not uncommon for customers to be paying—unknowingly—for services that they no longer use.

When a payer authorizes an automatic payment, merchants can present these to a payment gateway in one of two ways: as just a regular payment on a recurring basis, or as a one-time request for automatic fulfillment by the gateway on a recurring basis. In the former case, the merchant holds the authorization and the merchant sends a payment request to the payment gateway for each payment. In the latter case, the merchant declares to the gateway that it is a request for an automatic payment and asks the gateway to fulfill it on a regular basis. In the merchant-centric paradigm, this distinction is invisible to the payer since the payer is not involved in the payment. Merchants often use the former approach—get the credentials and authorization from the payer once, and then present the payment to a payment gateway on a recurring basis—as a ploy to stay under the radar. With our invention, since all payments go through the payer, the former approach will require the payer's approval each time like any other payment and cannot stay under the radar. In other words, the former approach will be intercepted by our invention simply as a byproduct of its payer-centricity.

Embodiment E5 handles automatic payments differently. Consider the automatic payment request's JSON shown in FIG. 28. When given such a request, the Payment Presenter PP 326 of the payer's Payer Agent 300 presents it to the payer for authorization as shown in FIG. 29 (2902). Note that the customer can authorize it like any other payment, in which case the Payer agent PA 300 would automatically pay this request every month or each time it is presented by the merchant. But a more fastidious customer has the option to be reminded each time this payment is paid so that recurring payments cannot slip under the customer's radar.

Further, the PA 300 keeps a record of all authorized automatic payments not only so they can be paid automatically, but also to give the customer a consolidated view of all recurring payments that have been authorized by the customer. A customer can obtain a list of all her automatic payments and their invoices. See Screenshot 2904 from embodiment E5 showing all recurring payments for a customer (FIG. 29).

Embodiment E6: A Payer-Centric Ticket Kiosk

Imagine a bus company that operates buses between two cities. FIG. 30 shows the bus company's ticket vending kiosk which is just a poster at the bus station. When a customer scans the poster, E6 will vend individually verifiable tickets for a given trip. FIG. 33 shows a pictorial representation of the ticket vending process.

In FIG. 10, we showed how merchants can choose various parameters pertaining to their business, including the payment model. One of the payment models they can specify is "tickets for events". Our bus company, Pegasus, registers as a ticket vendor and creates a payment request for tickets its Merchant Agent MA 302 and generates a poster with a QR code identifying the payment request. FIG. 30 shows the poster and 3102 of FIG. 31 shows the JSON representation of Pegasus's payment request. This request specifies that a customer can buy multiple tickets up to a maximum of 6 per customer, up to a maximum of 62 tickets until 11:40 am on the specified day. Further, the bus company requests tickets be issued in PDF417 code—the code typically used for tickets and boarding passes—with a unique ID for each ticket. It also provides an image for a human identifiable stub.

To buy a ticket, a customer scans the QR code from the company's poster (3302). In response, the customer's Payer Agent PA 300 retrieves the payment request, recognizes that the request is for a ticket, verifies that the number of tickets that have been fulfilled thus far is less than the maximum specified (3304), and sends the payment request to the Payment Presenter PP 326. 3104 of FIG. 31 shows PP 326's rendition of Pegasus' payment request. The customer can pay as described in earlier embodiments (3306). When the customer pays, PA 300 performs three actions: (a) it increments the number of tickets fulfilled, (b) it generates random serial numbers for the tickets (3310), creates a PTR (3308) and attaches the ticket numbers to the body of the PTR and sends it to the Payment Bus PB 312, and (c) passes the serial numbers to the Payment Presenter 326 which generates the tickets in the PDF417 format requested by the merchant (3312). See 3202 (FIG. 32) for a screenshot from E6 where the payer is provided two tickets in both human-readable and PDF417 format with unique serial numbers. If the number of sold tickets has not reached the specified maximum in the payment request, E6 retains the payment request in Payment Repository PR 314 so E6 can continue to vend more tickets.

How can Pegasus validate the tickets? Since the ticket numbers were attached to the body of the corresponding PTRs (3310), Pegasus has access to the ticket numbers. 3204 (FIG. 32) is a screenshot of Pegasus' ticket validation app. When a customer presents a ticket, this app scans the ticket (3314) for its serial number; it then looks for an associated PTR that has the said serial number in its body (3316); if so, the ticket is verified to be genuine (3318).

Embodiment E6 underscores several advantages of our invention. First, by co-opting customers' devices for payment, the merchant has completely eliminated the need for a ticket vending infrastructure. Second, the merchant now has an elastic ticketing infrastructure whose capacity expands to accommodate as many payers who want to purchase tickets so there isn't a last-minute rush at one or two ticket vending machines or ticket counters. Third, payers did not have to visit yet another website and share payment information with the merchant, but simply go to their payment app which not only vends the ticket, but also stores the ticket and receipt with the payer's account rather than send them to the payer via another channel like email. Finally, this scenario also indicates that our invention can cater not just to a payment transaction but can invoke follow-up actions triggered by the completion of a payment.

In summary, this invention comprises structural components and associated methods that together support a different payment paradigm in which customers, rather than merchants, own and orchestrate the payment process. This results in lower costs for merchants and better security and privacy for customers. The many embodiments of this invention catering to widely differing payment scenarios attest to the generality, usefulness and originality of this invention.

Glossary

| | |
|---|---|
| Active payment request | Abbreviated APR, a payment request whose status is "active." Same as pending payment request. |
| API | Application Programming Interface. APIs enable computer programs to interact and exchange data with each other. |
| API endpoint | A named or addressable API that has a specific purpose. |
| Automatic payment | Used interchangeably, a more accurate term for recurring payments. They refer to multiple and/or periodic payments against a payment source based on a one-time authorization by the payer. |
| Customer | Same as payer. |
| HTTP POST | One of the standard methods supported by the HTTP protocol. The POST method is used to submit some data to a web server usually causing a change of state or side effect on the server. |

| | |
|---|---|
| Indicial | We define an indicial signal as one where the origin/destination of the signal is clear to a person. An indicial input originates from a clearly ascertainable source and an indicial output is aimed to a clearly ascertainable destination. |
| JSON | JavaScript Object Notation: A data interchange standard from European Computer Manufacturer's Association (ECMA). The standard is also known as ECMA-404. |
| Merchant | Same as payee. |
| NFC | Near Field Communications is a technology for very-short distance wireless, typically used in contactless payments. |
| Payee | Same as merchant. |
| Payer | Same as customer. |
| Payment credential | A credit card number, bank account number etc. along with information such as expiration date, a CVC code or any other data needed to authorize a payment using that payment source. |
| Payment message | Same as payment record. |
| Payment request | Abbreviated PR, a request for a payment, typically sent by a merchant to a payer. |
| Payment Transaction Record | Abbreviated PTR, a record typically created by a payer or payer agent to confirm a payment in response to a payment request. |
| PCPS or PCPS embodiment | Refers to any embodiment of this invention and stands for Payer-Centric Payment System. |
| Payment Gateway | A third-party service that clears card and back transactions with financial institutions, transfers money, and confirms a transaction. |
| PR | Without any other qualification, PR stands for payment request. References to Payment Repository are always qualified as PR 314. |
| PR 314 | Payment Repository 314. |
| Private key, Public key | A cipher used by a well-known encryption technique in which a pair of keys enable a message to be encrypted using a public key and decrypted with the corresponding private key. |
| PTR | Same as Payment Transaction Record. |
| QR code | Quick Response code, also called 2-dimensional bar code. QR codes can be used to transmit up to 4K of data visually. |
| Resolved payment request | A payment request that is no longer active either because it has been paid, withdrawn, past its expiry date or any other reason. |
| Session cookie | Same as website cookie, but the term is often used to refer to a cookie that tracks a specific user's browsing session. |
| .tld | Tld stands for top-level domain and is a common convention used to represent some random domain, as in p1.tld. |
| Webhook | A website URL that accepts a POST request in the HTTP or HTTPS protocol. Webhooks are typically used to inform a webserver of an event and/or pass data to a webserver. |
| Website cookie | Cookies are codes that a website stores inside a user's browser and enable a website to keep track of the state of a browser session. |

The invention claimed is:

1. A method for facilitating payer-centric electronic payments, the method comprising:
creating, by a merchant, a payment request for a commercial and/or financial transaction between the merchant and a payer, wherein the payment request specifies the merchant as the payee of the payment request and includes an associated unique online identity (ID) for the payment request;
sending, by the merchant, the payment request to an online payment bus, wherein the online payment bus is configured to be a store-and-forward conduit having a repository for storing payment messages between payers and merchants;
establishing, through a transfer of identifying information between the payer and the merchant, an association between the payer and the unique online ID of the payment request;
as a result of the established association, sending of the payment request by the payment bus to the payer via an authenticated network connection between the payment bus and the payer;
in response to the payer receiving the payment request, the payer initiates an electronic payment process to satisfy the payment request, the payment process comprising:
sending a payment message to an online payment gateway configured to cause the gateway to make a payment to the payee of the payment request using a payer-specified payment credential;
receiving, from the payment gateway, a payment confirmation that the payment to the payee has been successfully completed;
creating a payment transaction record that includes the unique online ID of the payment request and the confirmation from the payment gateway; and
sending the payment transaction record to the payment bus via the authenticated network connection between the payment bus and the payer;
receiving, by the merchant, the payment transaction record from the payment bus via an authenticated network connection between the payment bus and the merchant; and
in response to the merchant receiving the payment transaction record, modifying, by the merchant, the payment request, wherein the modification indicates that the payment request has been paid.

2. The method of claim 1 further comprising:
specifying by the merchant, information that identifies the payer of the payment request.

3. The method of claim 1 further comprising:
specifying by the merchant, a payment amount of the payment request.

4. The method of claim 1 further comprising:
specifying by the payer a payment amount in the transaction record.

5. The method of claim 4, wherein the payer-specified payment amount includes a tip amount.

6. The method of claim 1, wherein the transfer of identifying information between the payer and the merchant comprises:
the payer communicating information that identifies the payer; and
the merchant capturing the information communicated by the payer.

7. The method of claim 1, wherein the transfer of identifying information between the payer and the merchant comprises:
the merchant communicating information that identifies the merchant or the payment request or both; and
the payer capturing the information communicated by the merchant.

8. The method of claim 7 further comprising:
the payer, on capturing the information that identifies the merchant, retrieving the most recent payment request created by that merchant.

9. The method of claim 1, wherein sending the payment request to the payer by the payment bus comprises one or more items selected from a group consisting of:
dispatching, by the payment bus, the payment request to the payer; and
storing, by the payment bus, the payment request in the payment repository for on-demand retrieval by the payer.

10. The method of claim 1, wherein the payment record includes additional information for sharing between the merchant and the payer.

11. The method of claim 10, wherein the additional information is encrypted to be private between the merchant and the payer.

12. The method of claim 10, wherein the additional information comprises one or more items selected from the group consisting of: contents of a shopping cart, a bill of sale, a coupon, a customer survey, an API-endpoint, formatting instructions, and a commercial solicitation.

13. The method of claim 12 further comprising:
rendering the contents of a shopping cart on a computing device based on the additional information in the payment request.

14. The method of claim 10, wherein the additional information included in the payment transaction record comprises a shipping address of the payer.

15. The method of claim 1, wherein the payment request pertains to a recurring payment and a payment screen on a payer-operated computing device provides selectable options for a payer to specify if the payer must be reminded each time the recurring payment becomes due.

16. The method of claim 1 further comprising:
upon the merchant receiving a payment transaction record that confirms a payment by a payer to the merchant, the merchant executes at least one predetermined action in favor of the payer.

17. The method of claim 16, wherein the at least one predetermined action executed by the merchant is based, at least partly, on information included in a payment message pertaining to the payment transaction.

18. The method of claim 16, wherein the at least one predetermined action executed by the merchant comprises an action selected from the group consisting of:
modifying the status of the payment request, generating a receipt, printing a receipt, emailing a receipt, issuing a ticket, generating one or more coupons, sending a command to a vending machine, and activating a device.

19. The method of claim 1, wherein the payment bus substantially functions as only the repository if all merchants and payers are represented by the same agent.

20. The method of claim 1, wherein the merchant comprises an entity selected from the group consisting of an individual, a physical store, an online store, a vending machine, a kiosk, an institution, and any commercial outfit.

21. The method of claim 1, wherein a merchant is represented by a computer-implemented merchant agent that performs one or more actions on behalf of the merchant, and a payer is represented by a computer-implemented payer agent that performs one or more actions on behalf of the payer.

22. The method of claim 1, wherein the merchant includes any designated agent of the merchant, and the payer includes any designated agent of the payer.

\* \* \* \* \*